US009811134B2

(12) United States Patent
Yakame et al.

(10) Patent No.: US 9,811,134 B2
(45) Date of Patent: Nov. 7, 2017

(54) ELECTRONIC DEVICE, POWER SOURCE DEVICE, AND POWER CONTROL METHOD OF ELECTRONIC DEVICE

(71) Applicant: FUJITSU LIMITED, Kawasaki-shi, Kanagawa (JP)

(72) Inventors: Hirotaka Yakame, Kawasaki (JP); Yuji Maruyama, Kyoto (JP)

(73) Assignee: FUJITSU LIMITED, Kawasaki (JP)

( * ) Notice: Subject to any disclaimer, the term of this patent is extended or adjusted under 35 U.S.C. 154(b) by 489 days.

(21) Appl. No.: 14/505,339

(22) Filed: Oct. 2, 2014

(65) Prior Publication Data

US 2015/0015070 A1 Jan. 15, 2015

Related U.S. Application Data

(63) Continuation of application No. PCT/JP2012/002428, filed on Apr. 6, 2012.

(51) Int. Cl.
| | |
|---|---|
| *G06F 1/26* | (2006.01) |
| *H02J 7/00* | (2006.01) |
| *G05F 1/16* | (2006.01) |
| *G06F 1/16* | (2006.01) |
| *G06F 1/20* | (2006.01) |

(52) U.S. Cl.
CPC .......... *G06F 1/263* (2013.01); *G06F 1/1658* (2013.01); *G06F 1/203* (2013.01); *G06F 1/206* (2013.01); *H02J 7/0068* (2013.01); *Y10T 307/344* (2015.04)

(58) Field of Classification Search
CPC ........ G06F 1/263; G06F 1/1658; G06F 1/203; G06F 1/206; H02J 7/0068; Y10T 307/344
See application file for complete search history.

(56) References Cited

U.S. PATENT DOCUMENTS 5,629,602 A * 5/1997 Makino .................. G06F 1/263
 307/66
5,694,293 A 12/1997 Seto et al.
(Continued)

FOREIGN PATENT DOCUMENTS

| JP | 07-248854 | 9/1995 |
|---|---|---|
| JP | 08-185241 A | 7/1996 |

(Continued)

OTHER PUBLICATIONS

International Search Report of Int. Appl. No. PCT/JP2012/002428 dated Jun. 5, 2012.

(Continued)

*Primary Examiner* — Jared Fureman
*Assistant Examiner* — Rafael Pacheco
(74) *Attorney, Agent, or Firm* — Maschoff Brennan

(57) ABSTRACT

An electronic device includes a case; a power source unit including a heat generation unit, the power source unit being configured to be inserted in the case and slidable between a stored state in which the power source unit is stored in the case and an exposed state in which at least the heat generation unit is exposed from the case; a detection unit configured to detect the stored state or the exposed state of the power source unit; and a control unit configured to control a load with respect to the power source unit, according to the stored state or the exposed state detected by the detection unit.

16 Claims, 31 Drawing Sheets

(56) References Cited

U.S. PATENT DOCUMENTS

| | | | |
|---|---|---|---|
| 5,713,030 A * | 1/1998 | Evoy | G06F 1/206 |
| | | | 340/584 |
| 5,969,438 A | 10/1999 | Odaohara | |
| 6,031,718 A | 2/2000 | Suzuki et al. | |
| 2005/0116687 A1* | 6/2005 | Yokomizo | H02J 7/0068 |
| | | | 320/128 |

FOREIGN PATENT DOCUMENTS

| | | |
|---|---|---|
| JP | 09-198483 A | 7/1997 |
| JP | 10-260752 | 9/1998 |
| JP | 10-301672 A | 11/1998 |
| JP | 11-065715 A | 3/1999 |
| JP | 2000-357030 A | 12/2000 |
| JP | 2006-325343 A | 11/2006 |
| JP | 2007-264915 A | 10/2007 |

OTHER PUBLICATIONS

Office Action dated Apr. 28, 2015 issued with respect to the corresponding Japanese Patent Application No. 2014-508923 Partial translated office action.

* cited by examiner

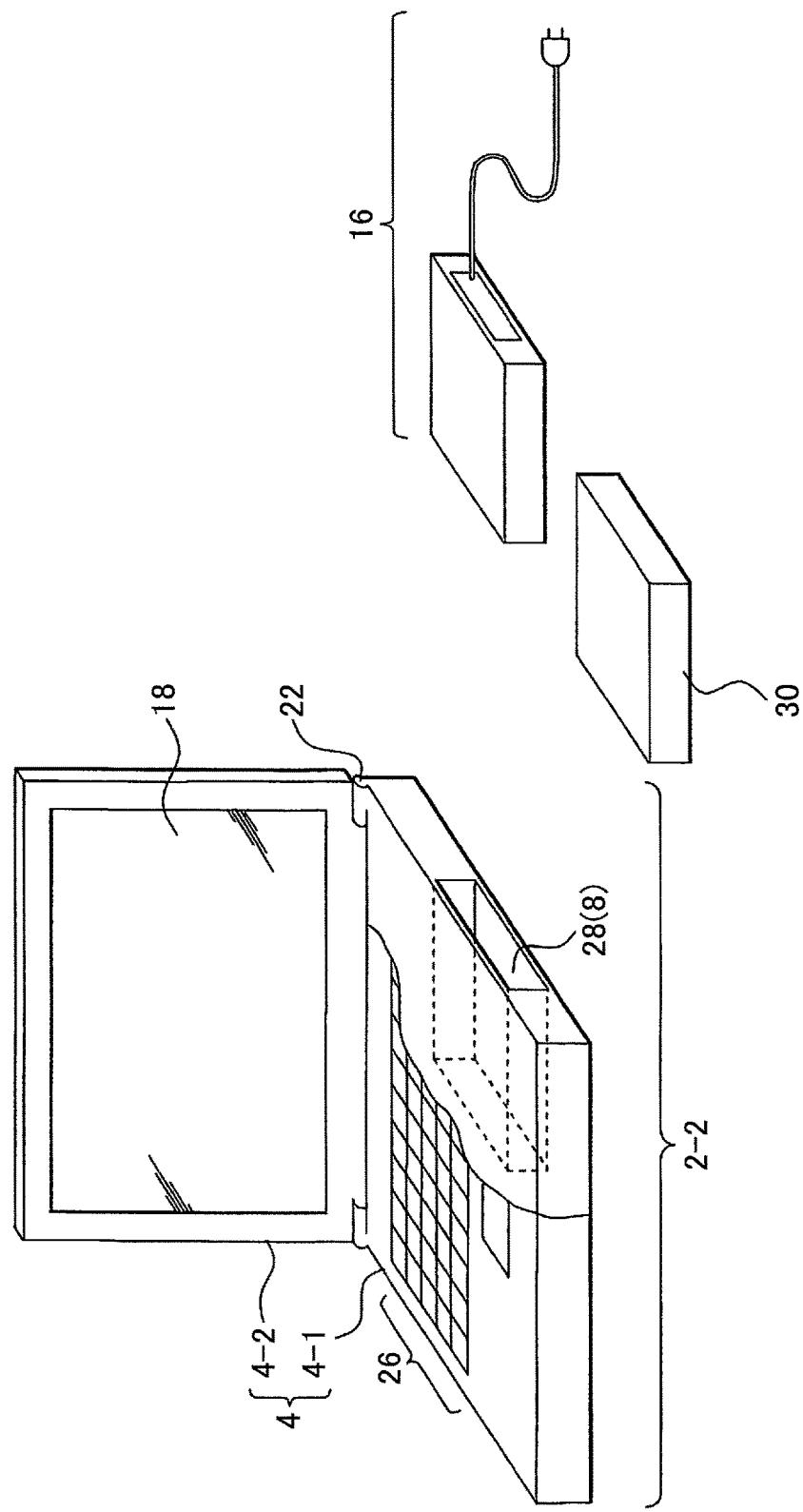

FIG.15

|  |  | SECOND DETECTION SIGNAL | |
|---|---|---|---|
|  |  | L | H |
| FIRST DETECTION SIGNAL | L | [FIRST CONNECTION FORM: 172]<br>SWITCH 100: OFF<br>SWITCH 102: OFF<br>SWITCH 104: ON<br>CHARGING<br>CIRCUIT 86: OFF | [FOURTH CONNECTION FORM: 178]<br>SWITCH 100: OFF<br>SWITCH 102: ON<br>SWITCH 104: OFF<br>CHARGING<br>CIRCUIT 86: OFF |
|  |  |  | [FIFTH CONNECTION FORM: 180]<br>SWITCH 100: OFF<br>SWITCH 102: ON<br>SWITCH 104: OFF<br>CHARGING<br>CIRCUIT 86: ON |
|  | H | [SECOND CONNECTION FORM: 174]<br>SWITCH 100: ON<br>SWITCH 102: OFF<br>SWITCH 104: ON<br>CHARGING<br>CIRCUIT 86: ON | [THIRD CONNECTION FORM: 176]<br>SWITCH 100: ON<br>SWITCH 102: OFF<br>SWITCH 104: OFF<br>CHARGING<br>CIRCUIT 86: ON |

ELECTRONIC DEVICE, POWER SOURCE DEVICE, AND POWER CONTROL METHOD OF ELECTRONIC DEVICE

CROSS-REFERENCE TO RELATED APPLICATION

This application is a U.S. continuation application filed under 35 USC 111(a) claiming benefit under 35 USC 120 and 365(c) of PCT Application PCT/JP2012/002428 filed on Apr. 6, 2012, the entire contents of which are incorporated herein by reference.

FIELD

The embodiments discussed herein are related to an electronic device such as a notebook computer using an AC adaptor as the power source, a power source device, and a power control method of an electronic device.

BACKGROUND

Electronic devices such as notebook computers are compact and light-weight, and are appropriate for being carried. It is known that when the electronic device is used outside, the electronic device is operated by a battery installed in the electronic device (see Patent Documents 1, 2, and 3). Furthermore, it is known that an AC adaptor is inserted in the bay of the electronic device, and the AC adaptor is connected to a commercial AC power source to operate the electronic device (see Patent Documents 1 and 2).

Patent Document 1: Japanese Laid-Open Patent Publication No. H10-301672
Patent Document 2: Japanese Laid-Open Patent Publication No. 2007-264915
Patent Document 3: Japanese Laid-Open Patent Publication No. 2000-357030

Incidentally, when a power source device is installed inside the electronic device, the electronic device has better portability compared to a case where the power source device is arranged outside the electronic device. However, when a power source device is installed inside the electronic device, the power source device is arranged in the limited space inside the electronic device, and the power source device generates heat inside the electronic device, and thus affects operations of the electronic device.

SUMMARY

According to an aspect of the embodiments, an electronic device includes a case; a power source unit including a heat generation unit, the power in source unit being configured to be inserted in the case and slidable between a stored state in which the power source unit is stored in the case and an exposed state in which at least the heat generation unit is exposed from the case; a detection unit configured to detect the stored state or the exposed state of the power source unit; and a control unit configured to control a load with respect to the power source unit, according to the stored state or the exposed state detected by the detection unit.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 3 illustrates a notebook computer according to a second embodiment;
FIG. 15 illustrates examples of connection forms of the power source system.

DESCRIPTION OF EMBODIMENTS

First Embodiment

Figure 1:
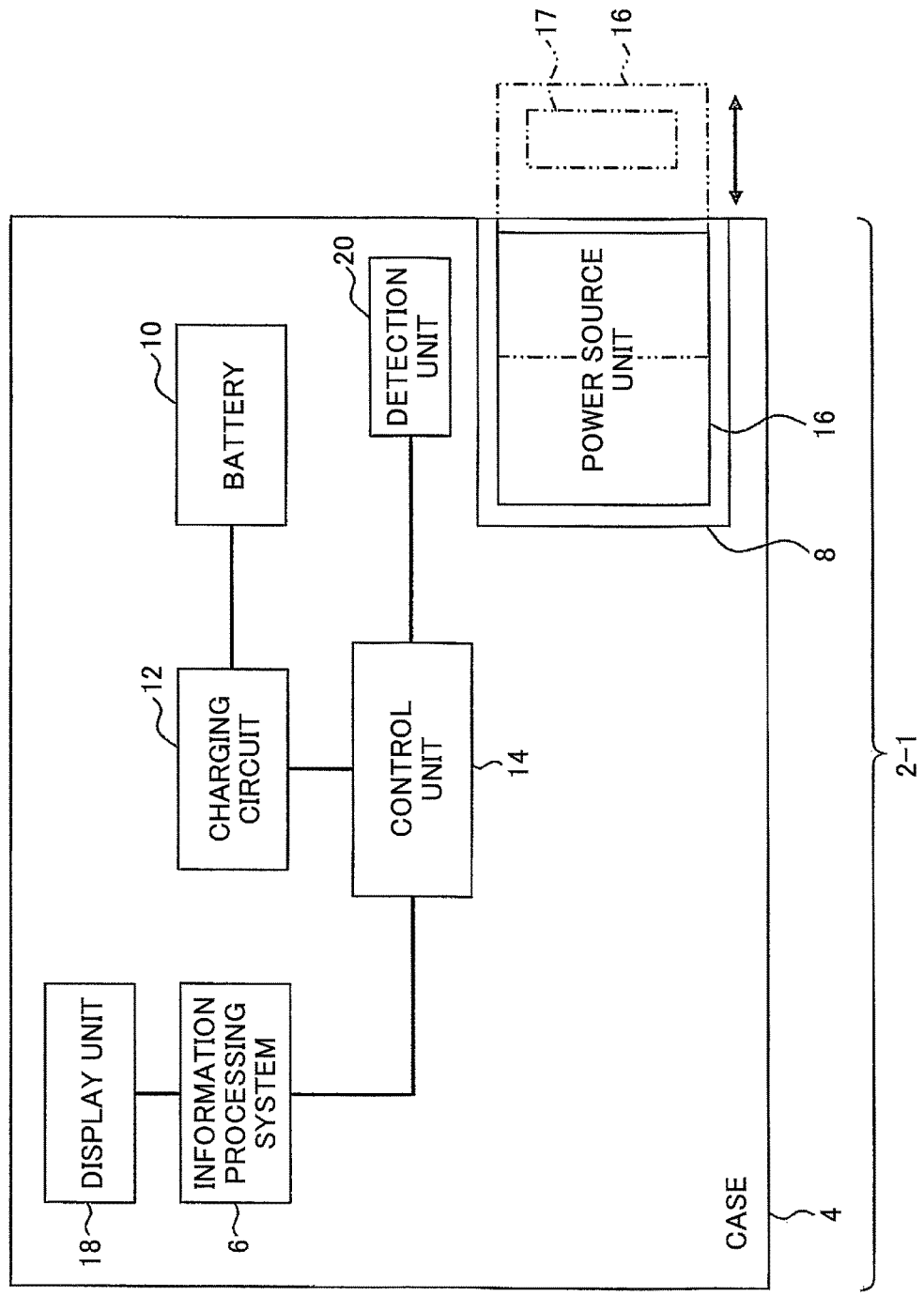
FIG. 1 illustrates an example of a notebook computer according to a first embodiment.

FIG. 1 illustrates an example of a notebook computer according to a first embodiment. The configuration illustrated in FIG. 1 is one example and embodiments of the present invention are not limited thereto.

A notebook computer (hereinafter, "PC") 2-1 is an example of an electronic device according to an embodiment of the present invention. This PC 2-1 is a portable personal computer, and includes a portable case 4. In this case 4, an information processing system 6 and a detection unit 20 are arranged, and as a power source system, a power source insertion bay 8, a battery 10, a charging circuit 12, and a control unit 14 are arranged.

The information processing system 6 includes a CPU (Central Processing Unit), circuits needed for information processing such as a chip set, and a memory. For example, the information processing system 6 is connected to a display unit 18. The display unit 18 displays display information such as characters and images, and is provided, for example, with a display such as a liquid crystal display and an organic EL (Electro Luminescence) display. The information processing system 6, the display unit 18, and the driving circuit of the display unit 18 are an example of an operation unit that is operated by a power source unit 16 or the battery 10. The information processing system 6, the charging circuit 12, the display unit 18, and the driving circuit of the display unit 18 constitute a load with respect to the battery 10 or the power source unit 16 that is inserted in the power source insertion bay 8.

The power source insertion bay 8 is an example of a storing unit for storing a power source unit such as the power source unit 16. The power source insertion bay 8 may be an exclusive-use bay for storing the power source unit, or may also serve as a bay into which other device units are inserted, such as a DVD (Digital Versatile Disc) unit and a hard disk unit.

The battery 10 is an example of the power source, and supplies accumulated power to the information processing system 6.

The charging circuit 12 is a circuit for charging the battery 10. The operation of the charging circuit 12 is switched by the control unit 14.

The power source unit 16 is an example of a power source device, and is detachably inserted in the power source insertion bay 8. The power source unit 16 is arranged in either a stored state where the power source unit 16 is stored inside the case 4, or in an exposed state where a heat generation unit 17 of the power source unit 16 is exposed from the case 4. The power source unit 16 is slidable from a stored state to an exposed state or from an exposed state to a stored state. Note that in FIG. 1, the power source unit 16 that is depicted by a solid line expresses the power source unit 16 in a stored state. The power source unit 16 depicted by a dashed-two dotted line expresses the power source unit 16 in an exposed state. The arrow applied to the power source unit 16 expresses the sliding of the power source unit 16.

The detection unit 20 detects the stored state or the exposed state of the power source unit 16, with respect to the case 4 and the power source insertion bay 8. For example, the detection unit 20 detects the proceeding/withdrawing of the power source unit 16. The detection unit 20 generates a detection signal expressing a stored state or an exposed state of the power source unit 16 with respect to the case 4 and the power source insertion bay 8.

The control unit 14 receives a detection signal from the detection unit 20, and controls the load with respect to the power source unit 16. When the detection unit 20 is generating a detection signal expressing an exposed state of the power source unit 16, the control unit 14 generates regular control output. Upon receiving regular control output, the charging circuit 12 is controlled to be in an operation state. In regular control, the load is not limited.

When the detection unit 20 is generating a detection signal expressing a stored state of the power source unit 16, the control unit 14 generates power saving control output. Upon receiving power saving control output, the load with respect to the power source unit 16 is limited to the charging circuit 12 or the information processing system 6, or to the charging circuit 12 and the information processing system 6. The charging circuit 12 suppresses the operation of the charging circuit 12. Furthermore, for example, the information processing system 6 reduces the operation clock speed of the CPU, and reduces the light emission amount of the display unit 18. The information processing system 6 may either reduce the operation clock speed of the CPU or reduce the light emission amount of the display unit 18.

Figure 2:
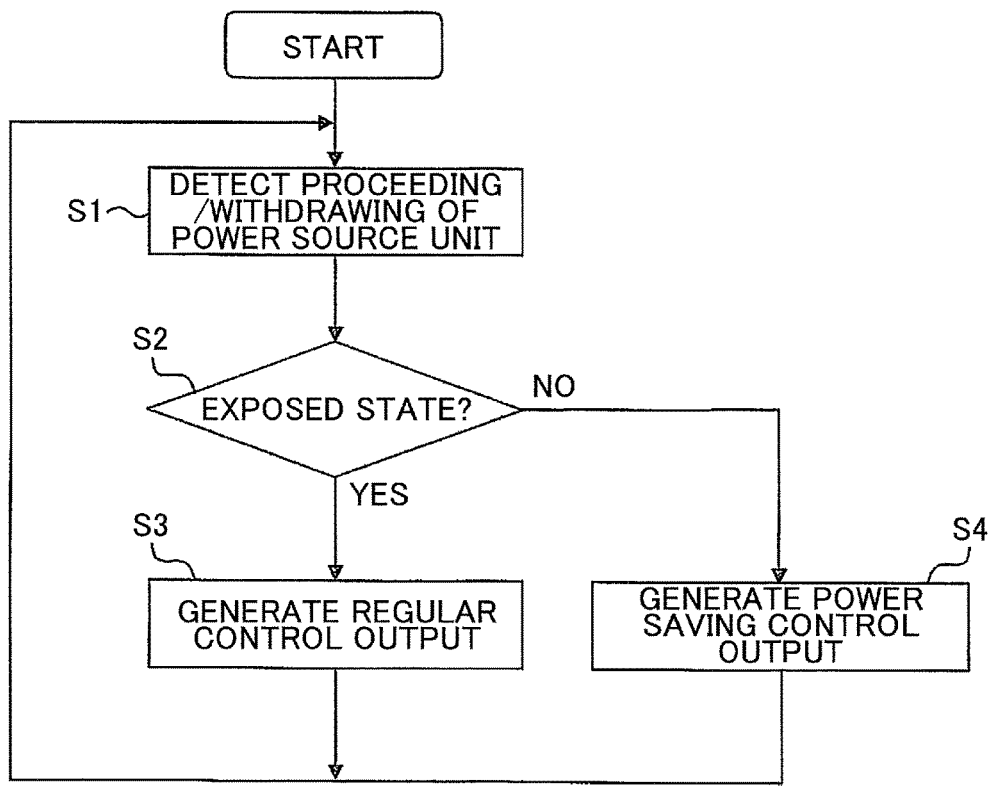
FIG. 2 illustrates a flowchart indicating an example of processing procedures of power source control.

FIG. 2 illustrates an example of processing procedures of power source control. The processing procedures illustrated in FIG. 2 are one example, and embodiments of the present invention are not limited thereto.

These processing procedures of power source control are performed when the power source unit 16 is inserted in the power source insertion bay 8. When the power source unit 16 is inserted in the power source insertion bay 8, the detection unit 20 detects the proceeding/withdrawing of the power source unit 16 (step S1). The detection result is sent to the control unit 14 as a detection signal. Upon receiving the detection signal from the detection unit 20, the control unit 14 determines whether the power source unit 16 is in an exposed state (step S2).

When the power source unit 16 is in an exposed state (YES in step S2), the control unit 14 generates regular control output (step S3). In this case, the PC 2-1 is controlled in a regular manner.

When the power source unit 16 is not in an exposed state (NO in step S2), the power source unit 16 is in a stored state, and therefore the control unit 14 generates power saving control output. In this case, in the PC 2-1, the load of the power source unit 16 is limited, and the PC 2-1 is controlled in a power saving manner.

The proceeding/withdrawing of the power source unit 16 is repeatedly detected. When the state of the power source unit 16 changes, the control output switches to another control output. Accordingly, according to the state of the power source unit 16, the control unit 14 may switch the poser source control of the PC 2-1.

Second Embodiment

Figure 4A:
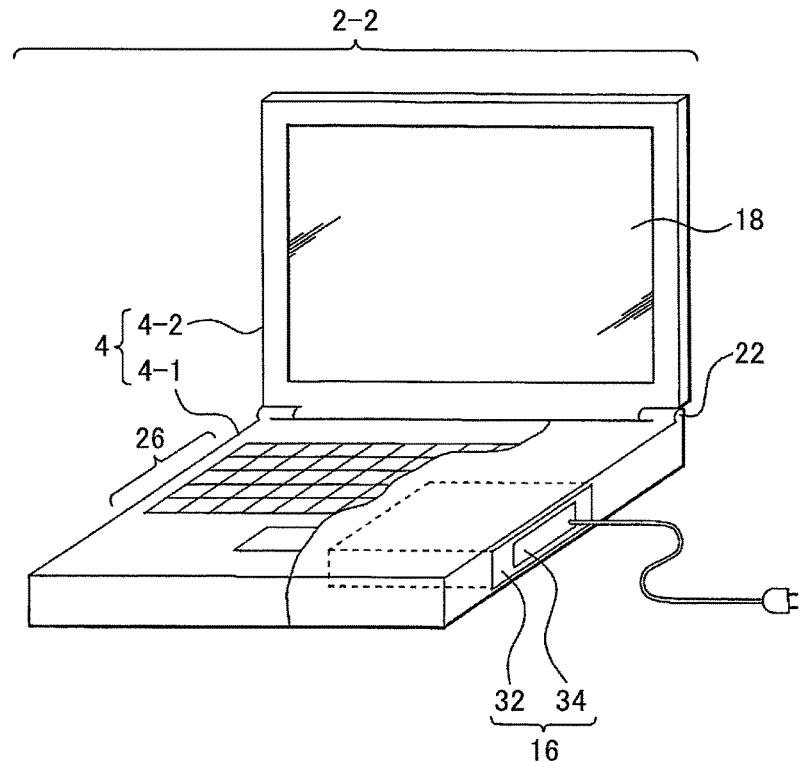
FIGS. 4A and 4B illustrate examples where a power source unit or a battery is inserted in a power source insertion bay.
Figure 4B:
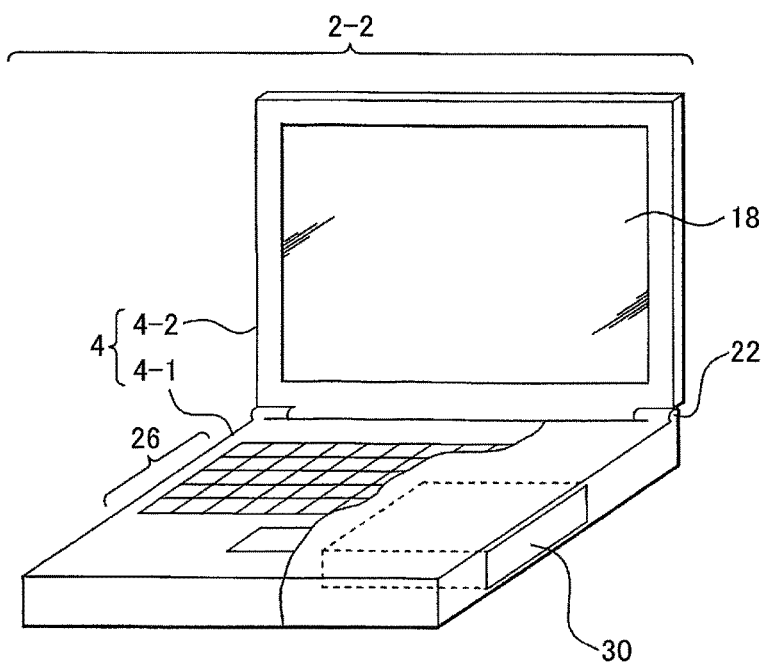

FIGS. 3 through 4B illustrate a PC according to a second embodiment.

The case 4 of a PC 2-2 is provided with a fixed side case 4-1 and a movable side case 4-2. The movable side case 4-2 is attached so as to be opened/closed with respect to the fixed side case 4-1, by a hinge part 22. The movable side case 4-2 is provided with the display unit 18 described above.

The fixed side case 4-1 is provided with a keyboard 26 on the top face side, and a power source insertion bay 28 is formed on the back face side of the keyboard 26. In the PC 2-2, the power source insertion bay 28 is provided on the right side middle part as viewed from the top face side of the fixed side case 4-1. To the power source insertion bay 28, the above-described power source unit 16 or a battery 30 is detachably inserted.

To the power source insertion bay 28, for example, the power source unit 16 is inserted as illustrated in FIG. 4A. Furthermore, to the power source insertion bay 28, for example, the battery 30 is inserted as illustrated in FIG. 4B. That is to say, the power source insertion bay 28 is an insertion space part for storing the power source unit 16 or the battery 30 inside the fixed side case 4-1. The inserted power source unit 16 or battery 30 is protected by the power source insertion bay 28.

Figure 5:
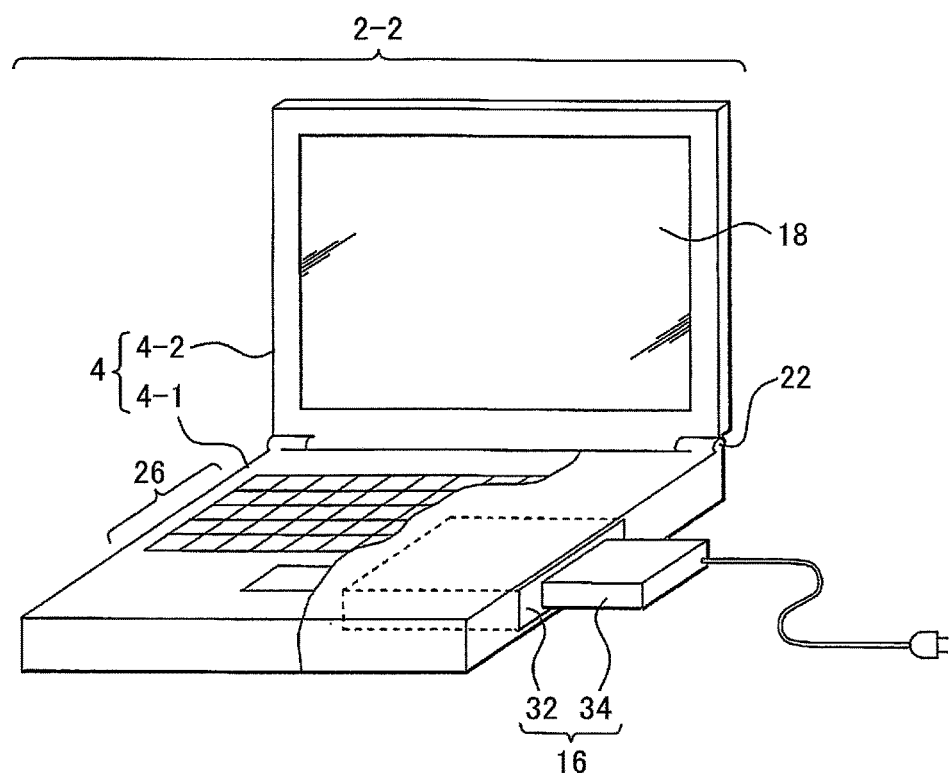
FIG. 5 illustrates an example where a heat generation unit of the power source unit is exposed.

The power source unit 16 is constituted by, for example, an AC adapter. The power source unit 16 is provided with an adaptor case 32 and an adaptor slide part 34. That is to say, the adaptor case 32 and the adaptor slide part 34 constitute a part of the power source unit 16. The adaptor slide part 34 is slidably provided in the adaptor case 32. That is to say, power source unit 16 may be inserted in the power source insertion bay 28, and the adaptor slide part 34 may be set in a stored state, or the adaptor slide part 34 may be slid to be in an exposed state of being exposed from the power source insertion bay 28. The power source unit 16 may be inserted in the power source insertion bay 28 as illustrated in FIG. 5, and set such that part of the adaptor slide part 34 is exposed.

Figure 6:
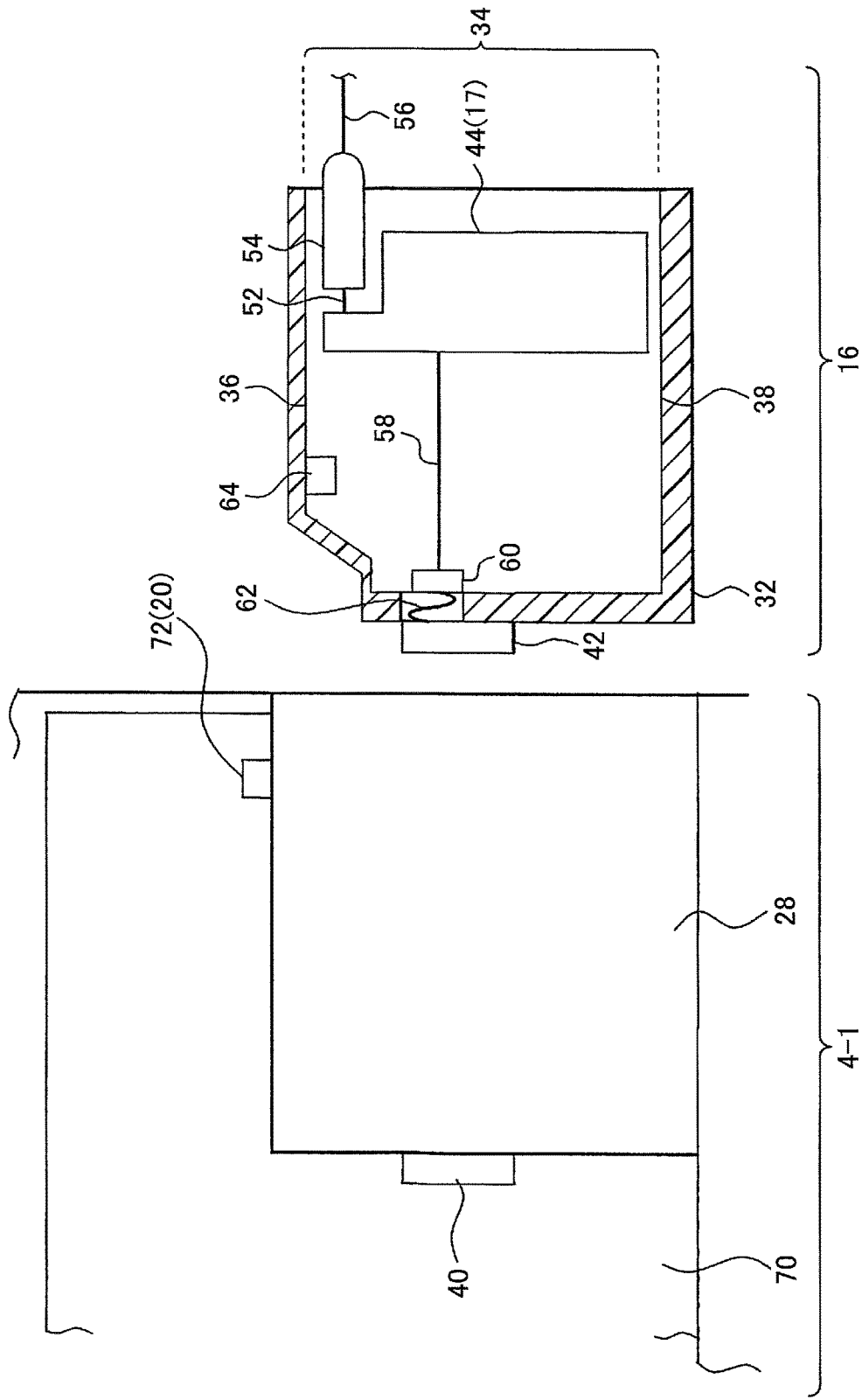
FIG. 6 illustrates an example of a power source unit and a power source insertion bay.

FIG. 6 illustrates an example of the power source unit 16 and the power source insertion bay 28. The configuration illustrated in FIG. 6 is one example and embodiments of the present invention are not limited thereto. In the power source unit 16 of FIG. 6, the internal structure of the power source unit 16 is illustrated, and therefore the outer edge of the adaptor case 32 and the adaptor slide part 34 are illustrated.

The adaptor slide part 34 is stored in a storage space part 35 (see FIG. 9) formed in the adaptor case 32. Between the side surfaces of the adaptor slide part 34 and the inner walls of the adaptor case 32, contact parts 36, 38 are provided. The contact parts 36, 38 are, for example, flat surfaces. Therefore, at each of the contact parts 36, 38, the adaptor slide part 34 is in contact with the inner wall of the adaptor case 32, making it possible of the adaptor slide part 34 to slide.

The adaptor case 32 is provided with a connection connector 42. When the power source unit 16 is connected to the power source insertion bay 28, the connection connector 42 is connected to a bay connector 40 arranged on a substrate 70 of the fixed side case 4-1, and the power source unit 16 is connected to the fixed side case 4-1.

Figure 7:
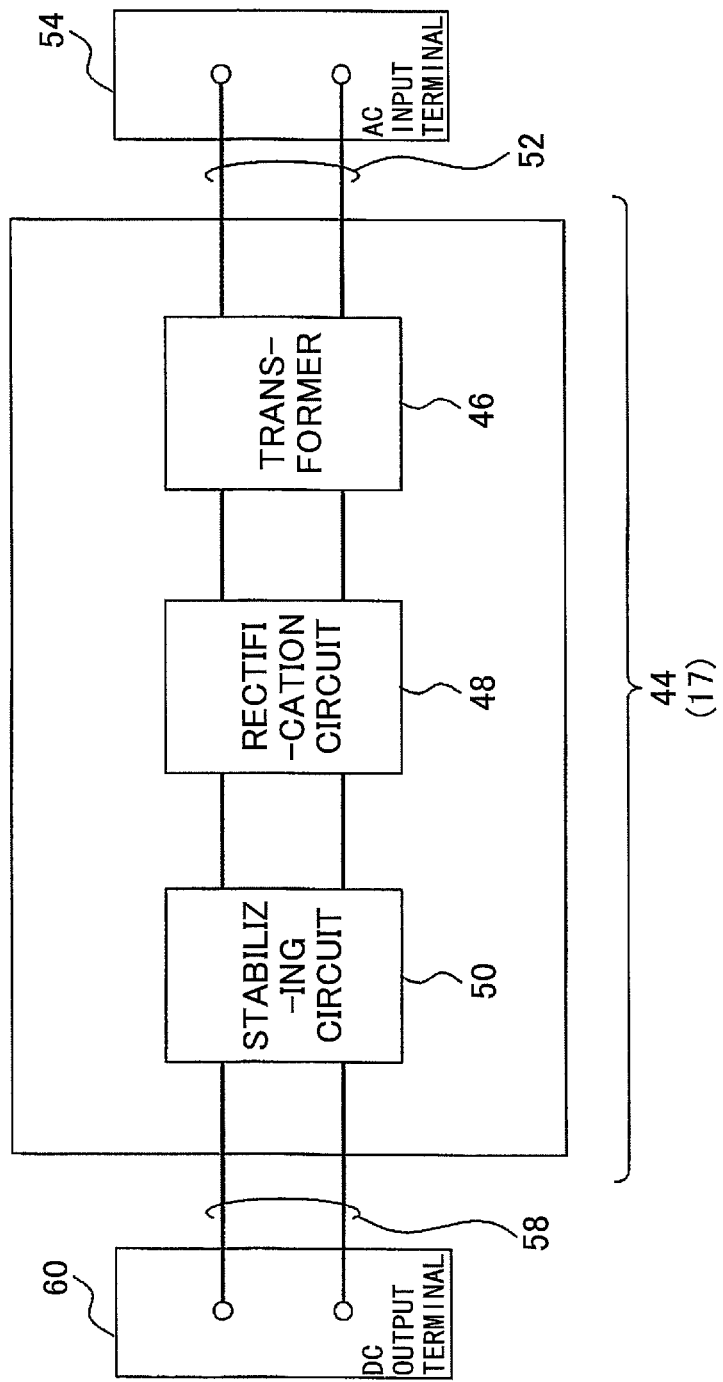
FIG. 7 illustrates an example of an AC adaptor.

In the adaptor slide part 34, an AC adaptor 44 is installed. The AC adaptor 44 is provided with an AC-DC conversion circuit, and converts AC (alternate current) to DC (direct current). As illustrated in FIG. 7, the AC adaptor 44 includes a transformer 46 for stepping down the AC, a rectification circuit 48 for rectifying an alternate current to a ripple current, and a stabilizing circuit 50 for stabilizing the ripple current and turning the ripple current into a direct current. The transformer 46, the rectification circuit 48, and the stabilizing circuit 50 constitute the above-described heat generation unit 17. Therefore, the power source unit 16 only needs to have a slide stroke such that the heat generation unit 17 may be exposed from the fixed side case 4-1. The AC adaptor 44 is connected to an AC input terminal 54 that is connected to a commercial power source, via a connection line 52. To the AC input terminal 54, a power source cable 56 (FIG. 6) is connected. By connecting the power source cable 56 to a commercial power source, an AC current is supplied to the AC adaptor 44. The AC adaptor 44 is connected to a DC output terminal 60 via a connection line 58, and a DC current is output from the DC output terminal 60.

The DC output terminal 60 is connected to the connection connector 42 via a power source cable 62 (FIG. 6). The power source cable 62 has stretching properties according to, for example, a spiral structure. The power source cable 62 has a sufficient length for connecting the connection connector 42 and the DC output terminal 60, when the adaptor slide part 34 is most exposed. Therefore, the connection between the connection connector 42 and the DC output terminal 60 is maintained, in either the case where the adaptor slide part 34 is in a stored state stored in the fixed side case 4-1, or the case where the adaptor slide part 34 is in an the exposed state exposed from the fixed side case 4-1.

In order to detect whether the heat generation unit 17 of the adaptor slide part 34 is in a stored state or an exposed state with respect to the power source insertion bay 28, a magnet 64 and a sensor 72 are provided. For example, the magnet 64 is provided at the adaptor slide part 34, and the sensor 72 is provided at the substrate 70 on the PC 2-2 side. The sensor 72 is an example of the above-described detection unit 20, and is, for example, an MR sensor (Magneto Resistive Sensor). By using an MR sensor, the magnetism of the magnet 64 may be detected with the use of a magnetism resistance effect. The detection signal of the sensor 72 is used for power source control in the PC 2-2.

Figure 8:
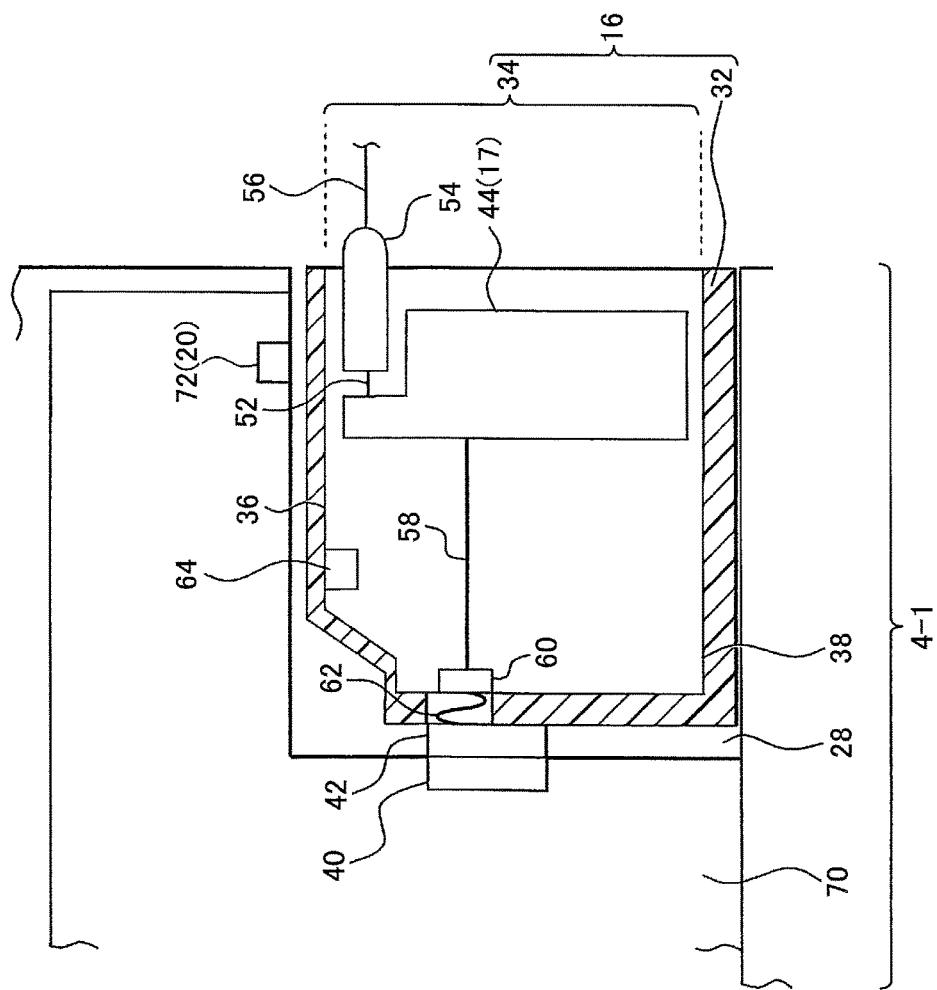
FIG. 8 illustrates an example where the power source unit is stored in the power source insertion bay.

FIG. 8 illustrates a state where the bay connector 40 is connected with the connection connector 42, and the adaptor slide part 34 is stored in the fixed side case 4-1 and the power source insertion bay 28. The AC adaptor 44, the adaptor case 32, and the adaptor slide part 34 are stored in the fixed side case 4-1 and the power source insertion bay 28.

By the connection of the bay connector 40 and the connection connector 42, it is possible to supply the DC current generated from the commercial power source to the substrate 70. In a state where the adaptor slide part 34 is stored in the fixed side case 4-1 and the power source insertion bay 28, the magnet 64 and the sensor 72 are spaced apart, and the sensor 72 does not detect the magnetism of the magnet 64. In this case, the detection signal output by the sensor 72 is, for example, L level (Low level). This detection signal of a L level is set at, for example, a voltage of 0 [V], and expresses that the state of the adaptor slide part 34 is in a stored state. By the detection signal of the sensor 72, the PC 2-2 recognizes that the adaptor slide part 34 is stored inside the fixed side case 4-1 and the power source insertion bay 28.

Figure 9:
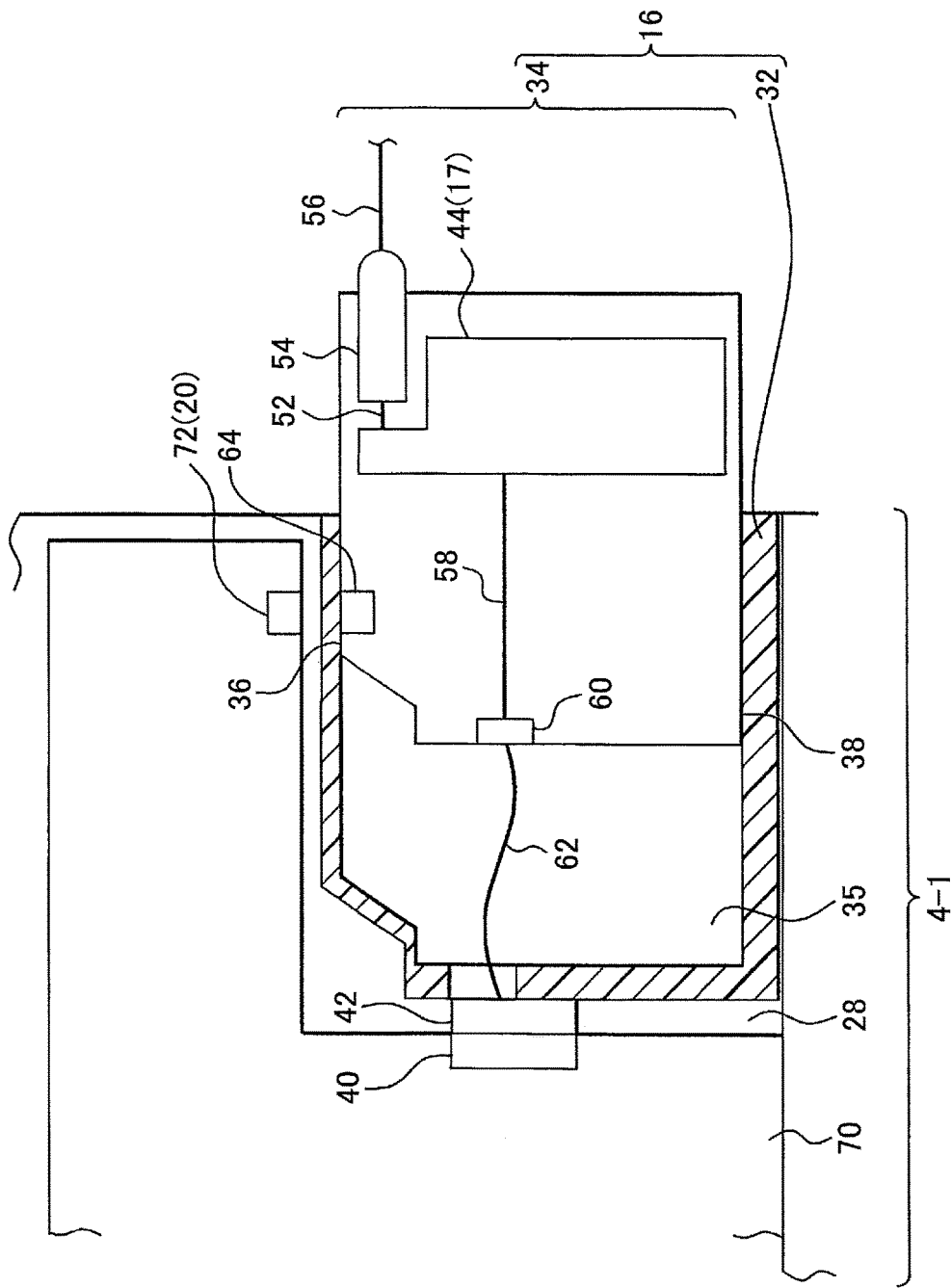
FIG. 9 illustrates an example where the power source unit is stored in the power source insertion bay and the heat generation unit of the power source unit is exposed.

FIG. 9 illustrates a state where the bay connector 40 and the connection connector 42 are connected, and the adaptor slide part 34 is exposed from the fixed side case 4-1 and the power source insertion bay 28. The AC adaptor 44 of the adaptor slide part 34 is pulled out from the adaptor case 32, the fixed side case 4-1, and the power source insertion bay 28.

When the adaptor slide part 34 is exposed from the fixed side case 4-1 and the power source insertion bay 28, the magnet 64 and the sensor 72 come close to each other and face each other, and the sensor 72 detects the magnet 64. In this case, the detection signal output by the sensor 72 is, for example, H level (High level). This detection signal of a H level is set at, for example, 5 [V], and expresses that the state of the adaptor slide part 34 is an exposed state. By the detection signal of the sensor 72, the PC 2-2 recognizes that the adaptor slide part 34 is pulled out and exposed from the fixed side case 4-1 and the power source insertion bay 28.

Figure 10:
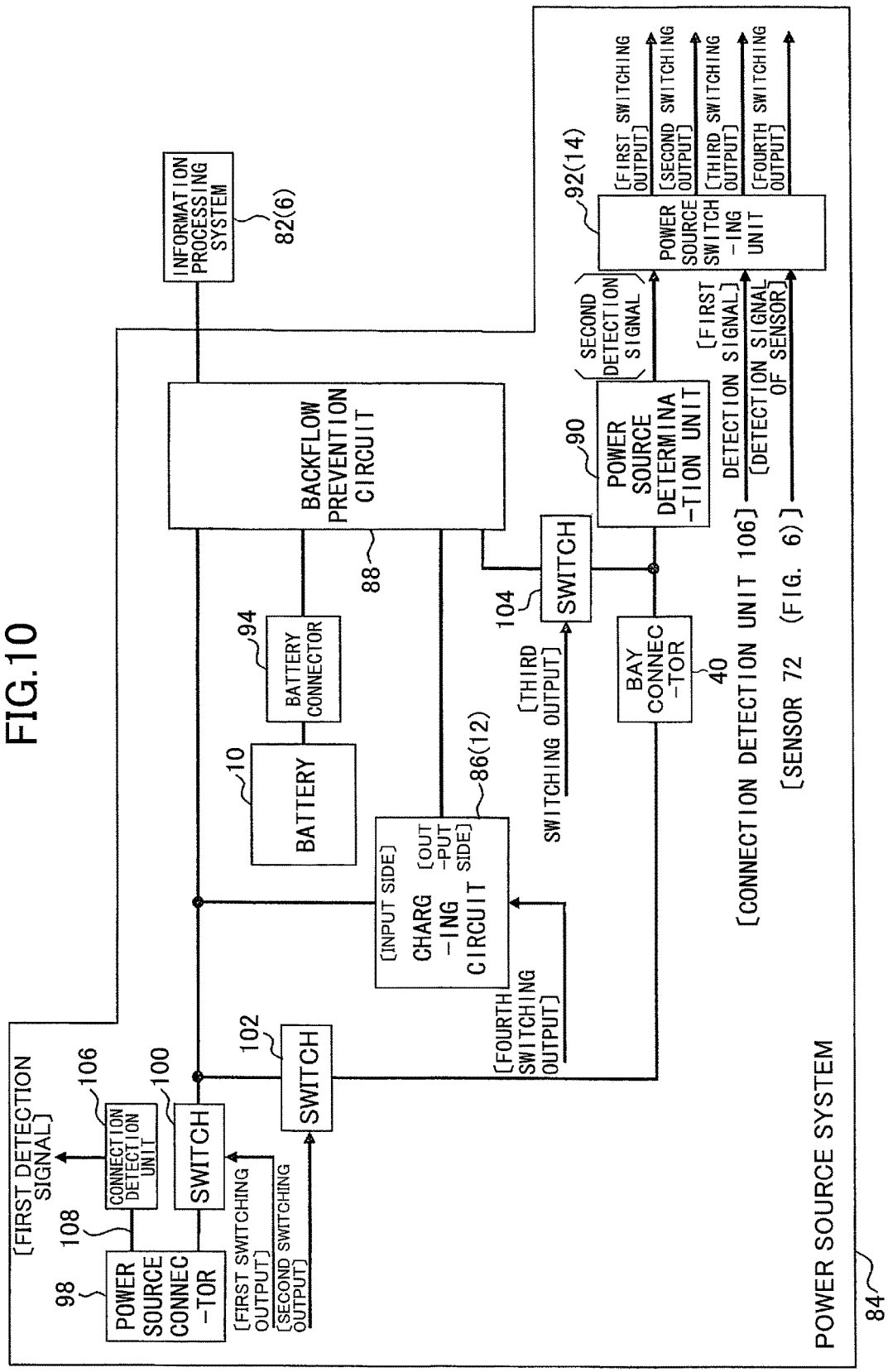
FIG. 10 illustrates an example of an information processing system and a power source system.

FIG. 10 illustrates an example of an information processing system 82 and a power source system 84. The configuration illustrated in FIG. 10 is one example and embodiments of the present invention are not limited thereto. The same elements as those of FIG. 1 are denoted by the same reference numerals. The information processing system 82 and the power source system 84 are an example of a system of the PC 2-2.

The information processing system 82 is an example of an operation unit, and is the same as the information processing system 6 according to the first embodiment, and therefore descriptions thereof are omitted.

The power source system 84 includes a charging circuit 86, a backflow prevention circuit 88, a power source determination unit 90, and a power source switching unit 92.

The charging circuit 86 is an example of the charging circuit 12, and charges the battery 10 connected to a battery connector 94. Furthermore, the charging circuit 86 also charges the battery 30 (FIG. 16) connected to the bay connector 40. The charging circuit 86 switches the operation according to a fourth switching output that is output from the power source switching unit 92. For example, when the voltage of the fourth switching output is at a H level, the charging circuit 86 switches to an ON state which is an operation state. When the voltage of the fourth switching output is at a L level, the charging circuit 86 switches to an OFF state which is a stop state. When charging the battery 10 and the battery 30, the charging circuit 86 switches to an ON state, and when the charging is suppressed, the charging circuit 86 switches to an OFF state.

The backflow prevention circuit 88 prevents the power supplied to the information processing system 82 from flowing back to the power source system 84, and prevents the power supplied from the battery 10 from flowing back to the charging circuit 86. The backflow prevention circuit 88 prevents the power supplied from the bay connector 40 from flowing back to the charging circuit 86.

The power source determination unit 90 determines the connection target of the bay connector 40, by the voltage. The power source determination unit 90 determines whether the power source unit 16 has been connected to the bay connector 40, or whether the battery 30 has been connected to the bay connector 40. When the power source unit 16 has been connected, for example, the power source determination unit 90 outputs a detection signal of a H level, and when the battery 30 has been connected, for example, the power source determination unit 90 outputs a detection signal of a L level. The detection signal of a H level is set to be, for example, 5 [V], which expresses the connection of the power source unit 16. The detection signal of a L level is set to be, for example, 0 [V], which expresses the connection of the battery 30. These detection signals are output as second detection signals, to the power source switching unit 92.

The power source switching unit 92 is an example of the control unit 14, and receives a first detection signal, a second detection signal, and a detection signal of a sensor, and generates switching output for the respective function units. As the respective function units, the power source system 84 is provided with three switches 100, 102, 104 for performing conduction or cutoff, and the charging circuit 86. The power source switching in unit 92 receives three detection signals, generates four switching outputs, and switches at least four function units. The first switching output, the second switching output, the third switching output, and the fourth switching output are respectively output to the switches 100, 102, 104 and the charging circuit 86. The power source switching unit 92 is constituted by, for example, a logic circuit.

The first detection signal expresses whether an AC adaptor 182 (FIG. 17) is connected to a power source connector 98. The power source switching unit 92 receives a first detection signal from a connection detection unit 106.

The connection detection unit 106 is an example of a means for detecting the connection of the AC adaptor 182 and the power source connector 98, and is provided with a detection conductive wire 108. For example, the detection conductive wire 108 is arranged to be connected to the negative polarity side of the AC adaptor 182, when the AC adaptor 182 is connected to the power source connector 98. When the AC adaptor 182 is not connected to the power source connector 98, the leading end of the detection conductive wire 108 is in a released state. In this case, for example, the connection detection unit 106 outputs a detection signal of a L level. Meanwhile, when the AC adaptor 182 is connected to the power source connector 98, the leading end of the detection conductive wire 108 is connected to ground via the negative electrode of the AC adaptor 182. In this case, for example, the connection detection unit 106 outputs a detection signal of a H level. A detection signal of a H level is set at, for example, 5 [V], which expresses the connection of the AC adaptor 182. A detection signal of a L level is set at, for example, 0 [V], which expresses the disconnection of the AC adaptor 182.

The second detection signal is, for example, a detection signal obtained from the power source determination unit 90, and expresses the type of power source connected to the bay connector 40. When the power source unit 16 is connected to the bay connector 40, the second detection signal is, for example, H level, and when the battery 30 is connected to the bay connector 40, the second detection signal is, for example, L level.

The detection signal of the sensor is a detection signal obtained from the sensor 72, and expresses whether the AC adaptor 44 of the adaptor slide part 34 is stored or exposed. When the AC adaptor 44 is stored, the detection signal of the sensor 72 is a L level, and when the AC adaptor 44 is exposed, the detection signal of the sensor 72 is a H level.

The switch 100 connects or disconnects the power source connector 98 to/from the input side of the charging circuit 86 and the backflow prevention circuit 88, by performing conduction or cutoff of power. When the switch 100 is ON, the switch 100 is electrically conductive, and the switch 100 connects the power source connector 98 to the charging circuit 86 and the backflow prevention circuit 88. Meanwhile, when the switch 100 is OFF, the switch 100 is electrically cut off, and the switch 100 disconnects the power source connector 98 from the charging circuit 86 and the backflow prevention circuit 88. That is to say, the switch 100 is also a switch for incorporating the power source connector 98 and the AC adaptor 182 connected to the power source connector 98, to the power source system 84 of the PC 2-2. When the AC adaptor 182 is incorporated in the power source system 84, the switch 100 is turned ON, and when the AC adaptor 182 in is cut away from the system, the switch 100 is turned OFF.

The switch 102 connects or disconnects the bay connector 40 to/from the input side of the charging circuit 86 and the backflow prevention circuit 88, by performing conduction or cutoff of power. When the switch 102 is ON, the switch 102 is electrically conductive, and the switch 102 connects the bay connector 40 to the charging circuit 86 and the backflow prevention circuit 88. Meanwhile, when the switch 102 is OFF, the switch 102 is electrically cutoff, and switch 102 disconnects the bay connector 40 from the charging circuit 86 and the backflow prevention circuit 88. That is to say, the switch 102 is also a switch for incorporating the bay connector 40 and the power source unit 16 or the battery 30 connected to the bay connector 40, to the power source system 84 of the PC 2-2. When the power source unit 16 is incorporated in the system, the switch 102 is turned ON, and otherwise, the switch 102 is turned OFF.

The switch 104 connects or disconnects the bay connector 40 to/from the backflow prevention circuit 88, by performing conduction or cutoff of power. When the switch 104 is ON, the switch 104 is electrically conductive, and switch 104 connects the bay connector 40 to the backflow prevention circuit 88. Meanwhile, when the switch 104 is OFF, the switch 104 is electrically cut off, and switch 104 disconnects the bay connector 40 from the backflow prevention circuit 88. That is to say, the switch 104 is also a switch for incorporating the bay connector 40 and the power source unit 16 or the battery 30 connected to the bay connector 40, to the system of the PC 2-2. When the battery 30 is incorporated in the system, the switch 104 is turned ON, and otherwise, the switch 104 is turned OFF.

As the switches 100, 102, 104, for example, a transistor such as a field effect transistor (FET) or a bipolar transistor may be used. When a transistor is used, the switch may be constituted with components having high versatility, and the switch may be constituted with a small number of components. Furthermore, the switches 100, 102, 104 may be constituted by a diode switch, in which the properties of a diode switch are used.

The first switching output that is output from the power source switching unit 92 is a switching signal with respect to the switch 100, and switches the switch 100 to be ON or OFF. The second switching output is a switching signal with respect to the switch 102, and switches the switch 102 to be ON or OFF. The third switching output is a switching signal with respect to the switch 104, and switches the switch 104 to be ON or OFF. The fourth switching output is a switching signal with respect to the charging circuit 86, and switches the charging circuit 86 to be in an ON state or an OFF state.

Figure 11:
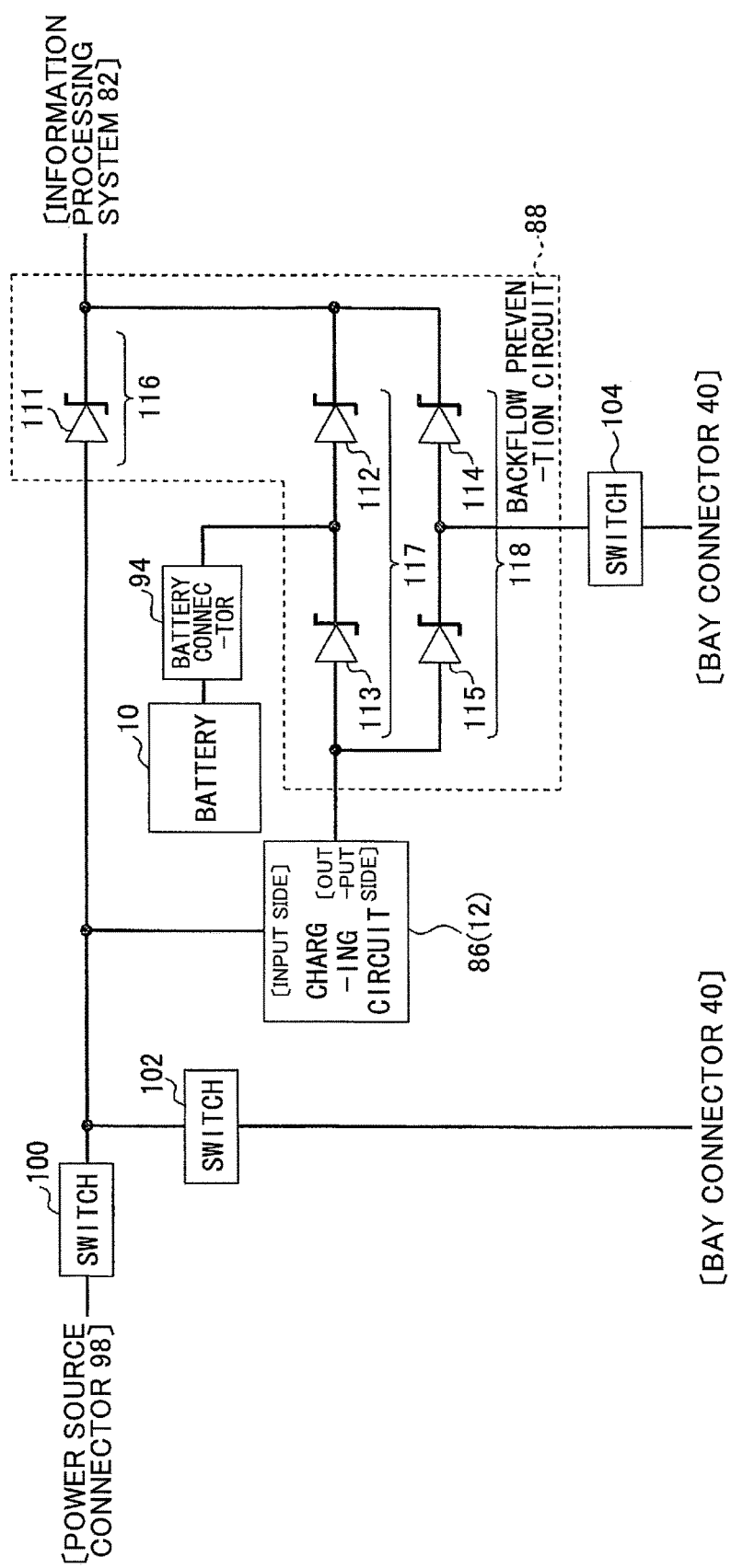
FIG. 11 illustrates an example of a backflow prevention circuit.

FIG. 11 illustrates an example of a backflow prevention circuit. The configuration illustrated in FIG. 11 is one example and embodiments of the present invention are not limited thereto. The backflow prevention circuit 88 includes five diodes 111, 112, 113, 114, 115. A first line 116 including the diode 111, a second line 117 including the diodes 112, 113, and a third line 118 including the diodes 114, 115 are connected in parallel. The first line 116 supplies power from the power source unit 16 or the battery 30 connected to the power source connector 98 or the bay connector 40, to the information processing system 82. The second line 117 supplies the power from the battery 10 to the information processing system 82, and supplies a charging current to the battery 10. The third line 118 supplies power from the power source unit 16 or the battery 30 connected to the bay connector 40, to the information processing system 82, and supplies a charging current to the battery 30 connected to the bay connector 40. As the diode, for example, a Zener diode is used. In the backflow prevention circuit 88, the breakdown voltage of the Zener diode is used, which is higher than the voltage of the power flowing through the power source system 84. Accordingly, it is possible to prevent the backflow of power by the diodes 111, 112, 113, 114, 115. The backflow prevention circuit 88 uses diodes, and therefore the circuit of the backflow prevention circuit 88 may be constituted with components having high versatility, and the circuit of the backflow prevention circuit 88 may be constituted with a small number of components.

The diode 111 prevents the power supplied to the information processing system 82 from flowing back to the switches 100, 102 and the input side of the charging circuit 86.

The diode 112 and the diode 113 are connected in series, and form a first diode array. The diode 114 and the diode 115 are connected in series, and form a second diode array. The first diode array and the second diode array are connected in parallel, thereby forming a diode circuit including four diodes. To the input side of this diode circuit, the output side of the charging circuit 86 is connected, and to the output side of this diode circuit, the information processing system 82 is connected. That is to say, the direction from the charging circuit 86 to the information processing system 82 becomes the direction in which the power (current) flows, i.e., a forward current direction. Accordingly, the diode circuit prevents the power from flowing back to the batteries 10, 30 and the output side of the charging circuit 86.

Between the diode 112 and the diode 113, the battery connector 94 is connected. The diode 112 prevents the power supplied to the information processing system 82 from flowing back to the battery connector 94 and the charging circuit 86. The diode 113 prevents the power output from the battery connector 94 from flowing back to the charging circuit 86.

Between the diode 114 and the diode 115, the switch 104 is connected. The diode 114 prevents the power supplied to the information processing system 82 from flowing back to the switch 104 and the charging circuit 86. When the power output from the bay connector 40 is supplied to the information processing system 82 via the switch 104, the diode 115 prevents this power from flowing back to the charging circuit 86.

The switch 104 and the battery connector 94 connected to the bay connector 40 are respectively connected between diodes of different diode arrays. Thus, by connecting these diode arrays in parallel, the diode circuit insulates the switch 104 from the battery connector 94, such that the power at the switch 104 and the power at the battery connector 94 are respectively prevented from flowing back.

Figure 12:
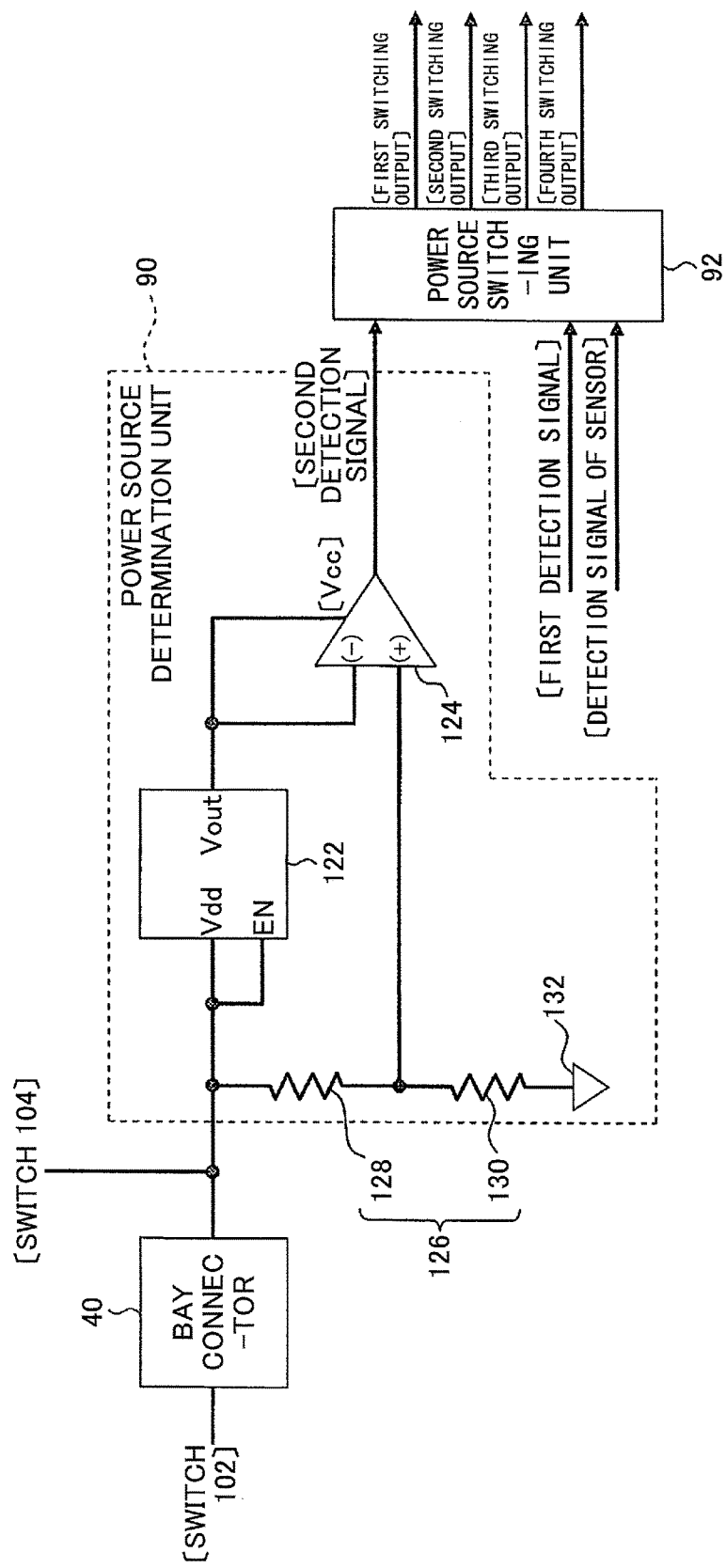
FIG. 12 illustrates an example of a power source determination unit.

FIG. 12 illustrates an example of the power source determination unit 90. The configuration illustrated in FIG. 12 is one example and embodiments of the present invention are not limited thereto.

The power source determination unit 90 is, for example, a determination circuit, which determines whether the device connected to the bay connector 40 is the battery 30 or the power source unit 16 such as an AC adaptor. The battery 30 and the power source unit 16 have different output voltages. The output voltage of the battery 30 is, for example, 12 [V]. The output voltage of the power source unit 16 is, for example, 19 [V]. In this case, the power source determination unit 90 allows the input voltage to be in a range of 12 [V] through 19 [V], and determines the power source according to the difference in the voltage.

The power source determination unit 90 includes a constant voltage circuit 122, a comparator 124, and a voltage-dividing circuit 126.

The input side terminal Vdd and the enable terminal EN of the constant voltage circuit 122 are connected to the bay connector 40, and receives a voltage in the range of, for example, 12 [V] through 19 [V]. In this case, the constant voltage circuit 122 adjusts the voltage to be constant, and outputs a voltage of, for example, 5 [V], from the output side terminal Vout. When neither the battery 30 nor the power source unit 16 is connected to the bay connector 40, the voltage at the input side terminal Vdd and the enable terminal EN becomes 0 [V]. In this case, the operation of the constant voltage circuit 122 is paused, and the voltage of the output side terminal Vout becomes 0 [V]. The constant voltage circuit 122 may be constituted with the use of, for example, a LDO (Low Drop Out) regulator.

The voltage of 5 [V] output by the constant voltage circuit 122 is input to the input terminal on the negative side (− side) of the comparator 124, and is also input to the Vcc of the comparator 124 as the power source. Meanwhile, the output voltage of the battery 30 or the power source unit 16 is reduced to, for example, a voltage of one third of the output voltage by the voltage-dividing circuit 126, and is input to the input terminal on the positive side (+ side) of the comparator 124. Due to the reduction of the voltage, the voltage at the input terminal on the positive side is approximately 4 [V] when the battery 30 is connected, and is approximately 6.3 [V] when the power source unit 16 is connected. By such a connection, when the battery 30 is connected, a detection signal of a L level is output, and when the power source unit 16 is connected, a detection signal of a H level is output. The output signal of the comparator 124 is output to the power source switching unit 92 as a second detection signal.

The voltage-dividing circuit 126 includes two resistive elements 128, 130, which are connected in series. The terminal part on the resistive element 128 side is connected to the bay connector 40 and the input side of the constant voltage circuit 122, and the terminal part on the resistive element 130 side is connected to ground 132. For example, when the value of the resistive element 128 is set to be R1=200 [kΩ], and the value of the resistive element 130 is set to be R2=100 [kΩ], the resistance value of the resistive element 130 is one third of the overall resistance value, and therefore the voltage is divided as 2:1. Thus, by connecting the input terminal on the positive side of the comparator 124 between the resistive elements 128, 130, the voltage-dividing circuit 126 supplies a voltage that is one third of that of the bay connector 40 side, to the input terminal on the positive side of the comparator 124.

Figure 13:
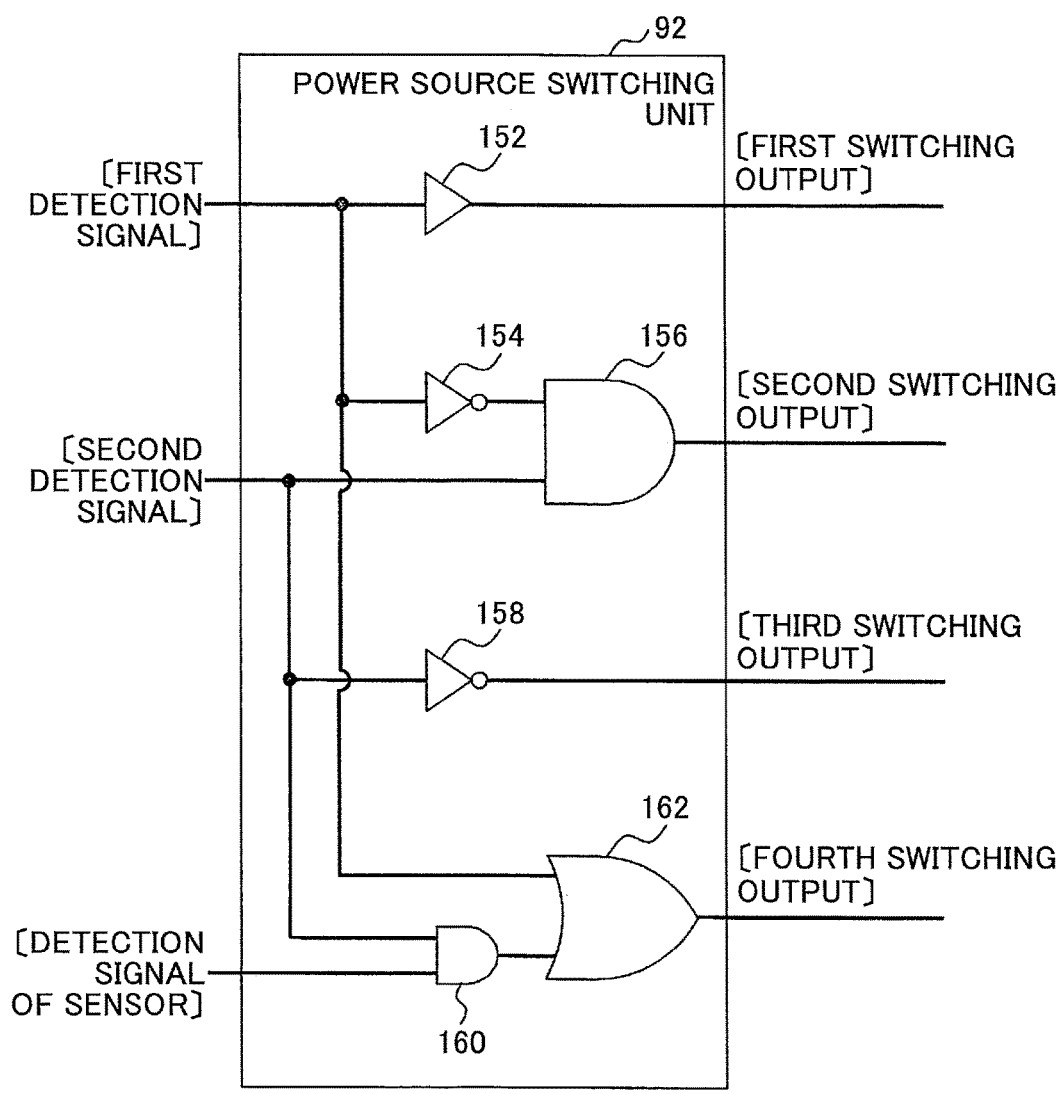
FIG. 13 illustrates an example of a power source switching unit.

FIG. 13 illustrates an example of the power source switching unit 92. The configuration illustrated in FIG. 13 is one example and embodiments of the present invention are not limited thereto.

The power source switching unit 92 is constituted by a logic circuit by using a buffer 152, NOT circuits 154, 158, AND circuits 156, 160, and an OR circuit 162. By forming the power source switching unit 92 with the use of the logic circuit, the power source switching unit 92 is easily formed and signals are processed at high speed. The NOT circuits 154, 158 are examples of negative circuits, the AND circuits 156, 160 are examples of logical product circuits, and the OR circuit 162 is an example of a logical sum circuit.

The first switching output is generated from a first detection signal by using the buffer 152. The first switching signal is obtained by outputting the first detection signal via the buffer 152.

The second switching output is generated from the first detection signal and a second detection signal by using the NOT circuit 154 and the AND circuit 156. The NOT circuit 154 receives the first detection signal, inverts the first detection signal, and outputs the inverted first detection signal. The AND circuit 156 receives the output obtained by inverting the first detection signal from the NOT circuit 154 and the second detection signal, and outputs a logical product of these signals. The output of the AND circuit 156 is used as the second switching output.

The third switching output is generated from the second detection signal by using the NOT circuit 158. The NOT circuit 158 receives the second detection signal, inverts the second detection signal, and outputs the inverted second detection signal. The output of the NOT circuit 158 is used as the third switching output.

The fourth switching output is generated from the first detection signal, the second detection signal, and the detection signal of the sensor 72, by using the AND circuit 160 and the OR circuit 162. The AND circuit 160 receives the second detection signal and the detection signal of the sensor 72, and outputs a logical product of these signals. The OR circuit 162 receives the first detection signal and the logical product output by the AND circuit 160, and outputs a logical sum of these signals. The output of the OR circuit 162 is used as the fourth switching output.

Figure 14:
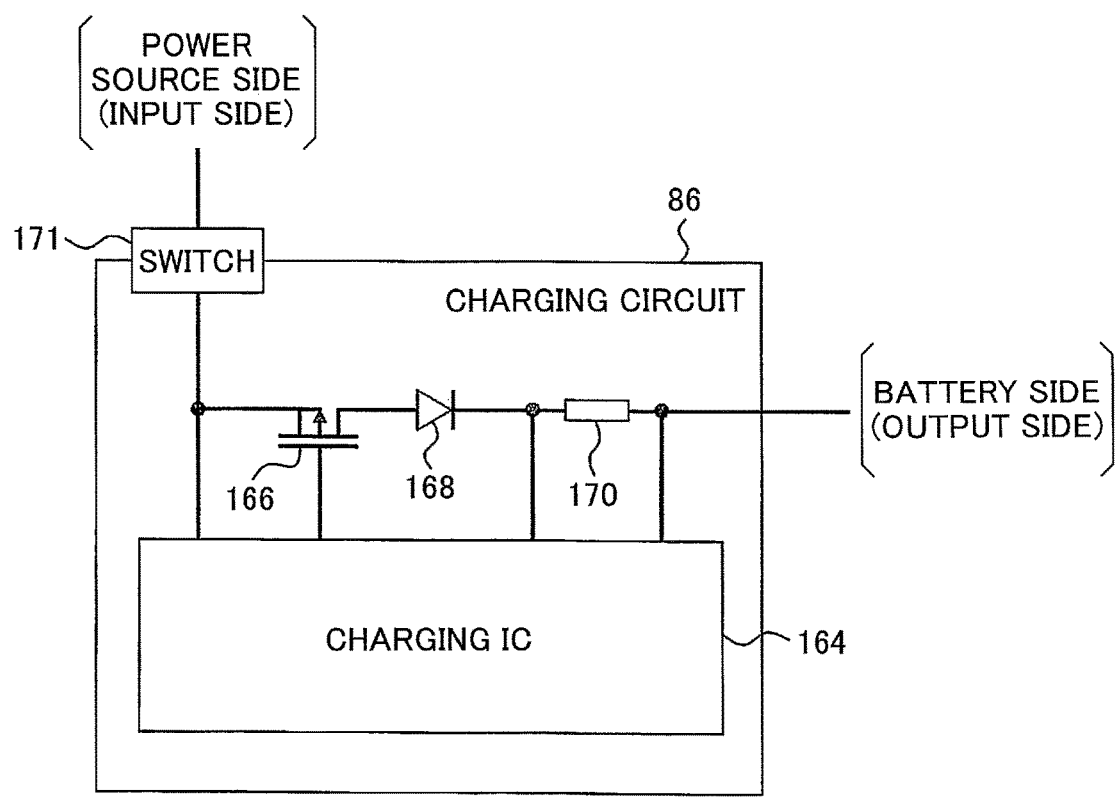
FIG. 14 illustrates an example of a charging circuit.

FIG. 14 illustrates an example of a charging circuit. The configuration illustrated in FIG. 14 is one example and embodiments of the present invention are not limited thereto.

The charging circuit 86 includes a charging IC (Integrated Circuit) 164. In the charging IC 164, circuit parts that may be integrated (IC), such as a charge control unit, are integrated. As external circuits of this charging IC 164, for example, a PMOS (Positive channel Metal Oxide Semiconductor) transistor 166, a diode 168, and a sense resistor 170 are arranged. The PMOS transistor 166 is an example of a charge control element, and the diode 168 is an example of a backflow prevention element. The PMOS transistor 166, the diode 168, and the sense resistor 170 are connected and series, and form, for example, a charging path through which a charging current flows. The sense resistor 170 converts the charging current flowing through the charging path into a voltage and detects the voltage, and this detection voltage is added to the charging IC 164 as control information. The control output obtained by the charging IC 164 is added to the gate of the PMOS transistor 166, and constant current control or constant voltage control is executed.

The charging circuit 86 includes a switch 171. The switch 171 receives the fourth switching output, connects the charging circuit 86 to the circuit on the power source side, or disconnects the charging circuit 86 from the circuit on the power source side. When the switch 171 is ON and the switch 171 is electrically conductive, the charging circuit 86 turns into an operation state. Meanwhile, when the switch 171 is OFF and the switch 171 is electrically cut off, the charging circuit 86 turns into a stop state.

FIG. 15 illustrates examples of connection forms of the power source system. In FIG. 15, H expresses H level, and L expresses L level.

In a first connection form 172, the AC adaptor 182 (FIG. 17) is disconnected from the power source connector 98 and the battery 30 is connected to the bay connector 40. In this case, it is possible to discharge an electric current to the information processing system 82 and the power source system 84, from either the battery 10 or the battery 30, or both the battery 10 and the battery 30. In the first connection form 172, the first detection signal becomes L level and the second detection signal becomes L level. In this case, according to the first and second detection signals, the power source switching unit 92 sets the first, second, third, and fourth switching outputs to L level, L level, H level, and L level, respectively. According to these switching outputs, the switches 100, 102 turn OFF, and the switches 100, 102 do not incorporate the AC adaptor 182 or the battery 30 in the power source system 84. The switch 104 turns ON, and incorporates the battery 30 in the power source system 84.

The charging circuit 86 turns OFF, and does not charge the batteries 10, 30. In the first connection form 172, the switches 100, 102, 104 and the charging circuit 86 are turned ON or OFF, in regardless of the level of the detection signal of the sensor.

In a second connection form 174, the AC adaptor 182 is connected to the power source connector 98, and the battery 30 is connected to the bay connector 40. In this case, it is possible to discharge an electric current to the information processing system 82 and the power source system 84 from the AC adaptor 182, and it is possible to charge the batteries 10, 30. In the second connection form 174, the first detection signal becomes H level and the second detection signal becomes L level. In this case, according to the first and second detection signals, the power source switching unit 92 sets the first, second, third, and fourth switching outputs to H level, L, level, H level, and H level, respectively. According to these switching outputs, the switch 100 turns ON, and incorporates the AC adaptor 182 in the power source system 84. The switch 102 turns OFF, and does not incorporate the battery 30 in the power source system 84, and prevents the power supplied by the AC adaptor 182 from flowing back. The switch 104 turns ON, incorporates the battery 30 in the power source system 84, and makes it possible to charge the battery 30. The charging circuit 86 turns ON, and makes it possible to charge the batteries 10, 30 by the power of the AC adaptor 182. In the second connection form 174, the switches 100, 102, 104 and the charging circuit 86 are turned ON or OFF, regardless of the level of the detection signal of the sensor.

In a third connection form 176, the AC adaptor 182 is connected to the power source connector 98, and the power source unit 16 is connected to the bay connector 40. In this case, even if the power source unit 16 is connected to the in bay connector 40, an electric current is discharged to the information processing system 82 and the power source system 84 from the AC adaptor 182, and the battery 10 is charged by the power of the AC adaptor 182. That is to say, the switches are switched such that the AC adaptor 182 is prioritized over the power source unit 16 to be connected to the power source system 84. In the third connection form 174, the first and second detection signals become H level. In this case, according to the first and second detection signals, the power source switching unit 92 sets the first, second, third, and fourth switching outputs to H level, L, level, L level, and H level, respectively. According to these switching outputs, the switch 100 turns ON, and incorporates the AC adaptor 182 in the power source system 84. The switch 102 turns OFF, and does not incorporate the power source unit 16 in the power source system 84, and prevents the power supplied by the AC adaptor 182 from flowing back. The switch 104 turns OFF, does not incorporate the power source unit 16 in the power source system 84, and prevents the power supplied by the charging circuit 86 from flowing back to the bay connector 40. The charging circuit 86 turns ON, and the charging circuit 86 makes it possible to charge the battery 10 by the power of the AC adaptor 182. In the third connection form 176, the switches 100, 102, 104 and the charging circuit 86 are turned ON or OFF, regardless of the level of the detection signal of the sensor.

In a fourth connection form 178, the AC adaptor 182 is disconnected from the power source connector 98 and the power source unit 16 is connected to the bay connector 40. Furthermore, the AC adaptor 44 of the power source unit 16 is stored inside the adaptor case 32, and is stored inside the power source insertion bay 28 and the fixed side case 4-1. In this case, it is only possible to discharge an electric current to the information processing system 82 from the power source unit 16, and charging of the battery 10 is stopped. That is to say, the power source system 84 shifts to a power saving setting, and the AC adaptor 44 suppresses the heat generation inside the power source insertion bay 28 and the fixed side case 4-1. By shifting to the power saving setting, the generated heat of the power source unit 16 is prevented from adversely affecting the operations of the PC 2-2 main unit. In the fourth connection form 178, the first detection signal becomes L level, the second detection signal becomes H level, and the third detection signal becomes L level. In this case, according to these detection signals, the power source switching unit 92 sets the first, second, third, and fourth switching outputs to L level, H level, L level, and L level, respectively. The fourth switching output is an example of the above-described power saving control output. According to these switching outputs, the switches 100, 104 turn OFF. The switch 102 turns ON, and incorporates the power source unit 16 in the power source system 84. The charging circuit 86 turns OFF, and the charging circuit 86 does not charge the battery 10.

In a fifth connection form 180, the AC adaptor 182 is disconnected from the power source connector 98 and the power source unit 16 is connected to the bay connector 40. Furthermore, the AC adaptor 44 of the power source unit 16 is exposed from the adaptor case 32, and is exposed from the power source insertion bay 28 and the fixed side case 4-1. In this case, it is possible to discharge an electric current to the information processing system 82 from the power source unit 16, and the battery 10 is charged. Because the AC adaptor 44 is in an exposed state, the generated heat of the AC adaptor 44 is discharged outside the case 4, and the generated heat of the power source unit 16 is prevented from adversely affecting the operations of the PC 2-2 main unit. The AC adaptor 44 is able to output the maximum capable power, and the power source system 84 shifts to a regular power setting. In the fifth connection form 180, the first detection signal becomes L level, the second detection signal becomes H level, and the third detection signal becomes H level. In this case, according to these detection signals, the power source switching unit 92 sets the first, second, third, and fourth switching outputs to L level, H level, L level, and H level, respectively. The fourth switching output is an example of the above-described regular control output. According to these switching outputs, the switches 100, 104 turn OFF. The switch 102 turns ON, and incorporates the power source unit 16 in the power source system 84. The charging circuit 86 turns ON, and the charging circuit 86 charges the battery 10.

The power source system and information processing system illustrated in FIGS. 16 through 20 are examples of the above-described first through fifth connection forms 172, 174, 176, 178, 180, respectively. The power source system 84 illustrated in FIGS. 16 through 20 uses the backflow prevention circuit 88 illustrated in FIG. 11. In FIGS. 10 and 11, the same elements are denoted by the same reference numerals. In each diagram, a thick line expresses that power (current) flows between elements illustrated at the ends of the line, such as a connector, a switch, a power source, a diode, a circuit, or a system. In each diagram, a thin line expresses that power does not flow, or substantially does not flow, between elements illustrated at the ends of the line. Note that the trace amount of current flowing to the power source determination unit 90 is expressed by a thin line.

Figure 16:
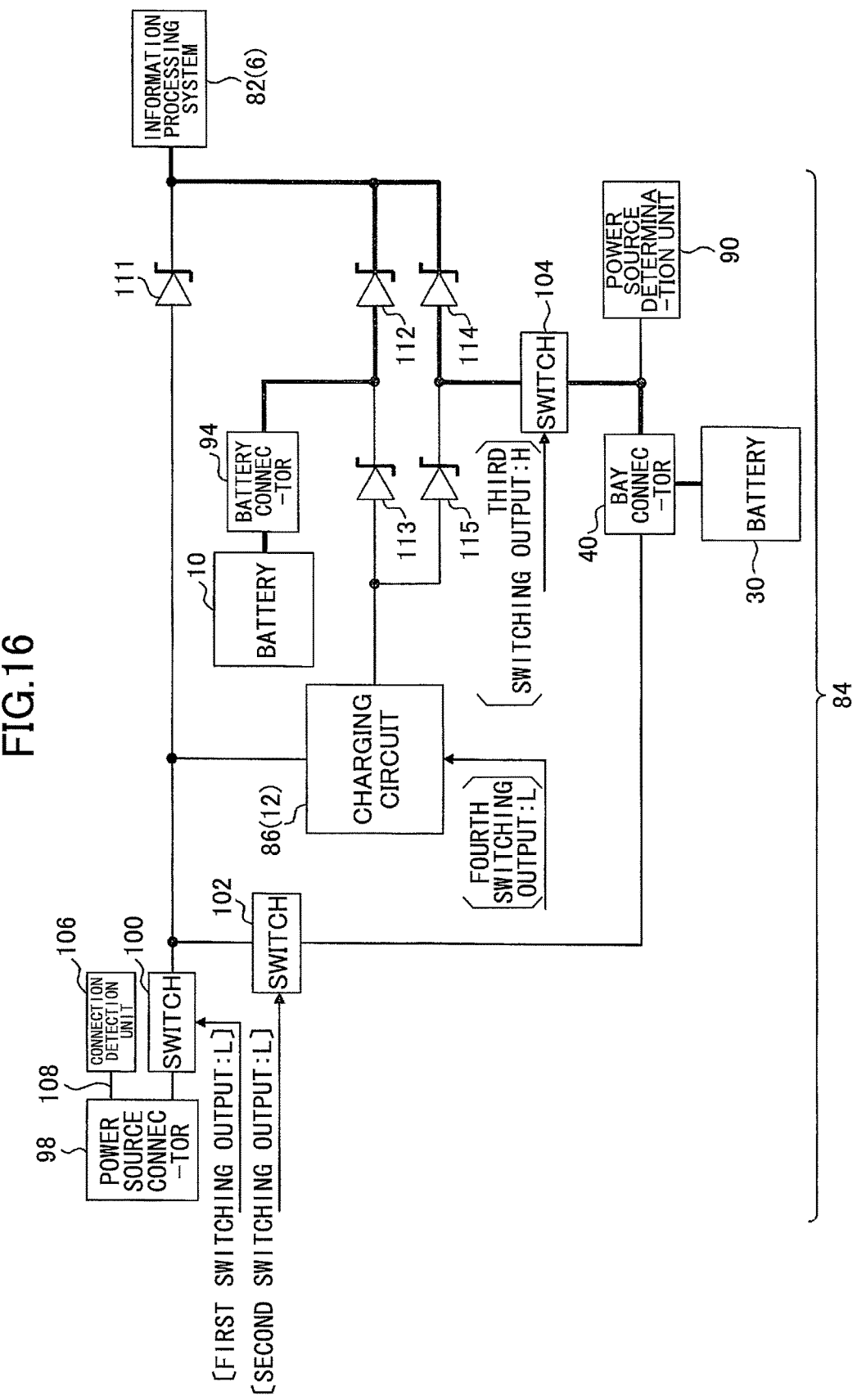
FIG. 16 illustrates an example of a first connection form of the power source system.

In the first connection form 172 illustrated in FIG. 16, the battery 30 is connected to the bay connector 40.

The diode 112 conducts the power of the battery 10 connected to the bay connector 40, and supplies the power to the information processing system 82. Meanwhile, the diode 113 prevents the power of the battery 10 from flowing back to the charging circuit 86.

The switch 104 and the diode 114 conducts the power of the battery 30 connected to the bay connector 40, and supplies the power to the information processing system 82. Meanwhile, the diode 115 prevents the power of the battery 30 from flowing back to the charging circuit 86.

The diode 111 prevents the power of the battery 10 and the battery 30 from flowing back to the switches 100, 102, and the charging circuit 86. The switch 102 cuts off the power of the battery 30 and prevents the power of the battery 30 from flowing to the information processing system 82 and the charging circuit 86 via the switch 102.

Figure 17:
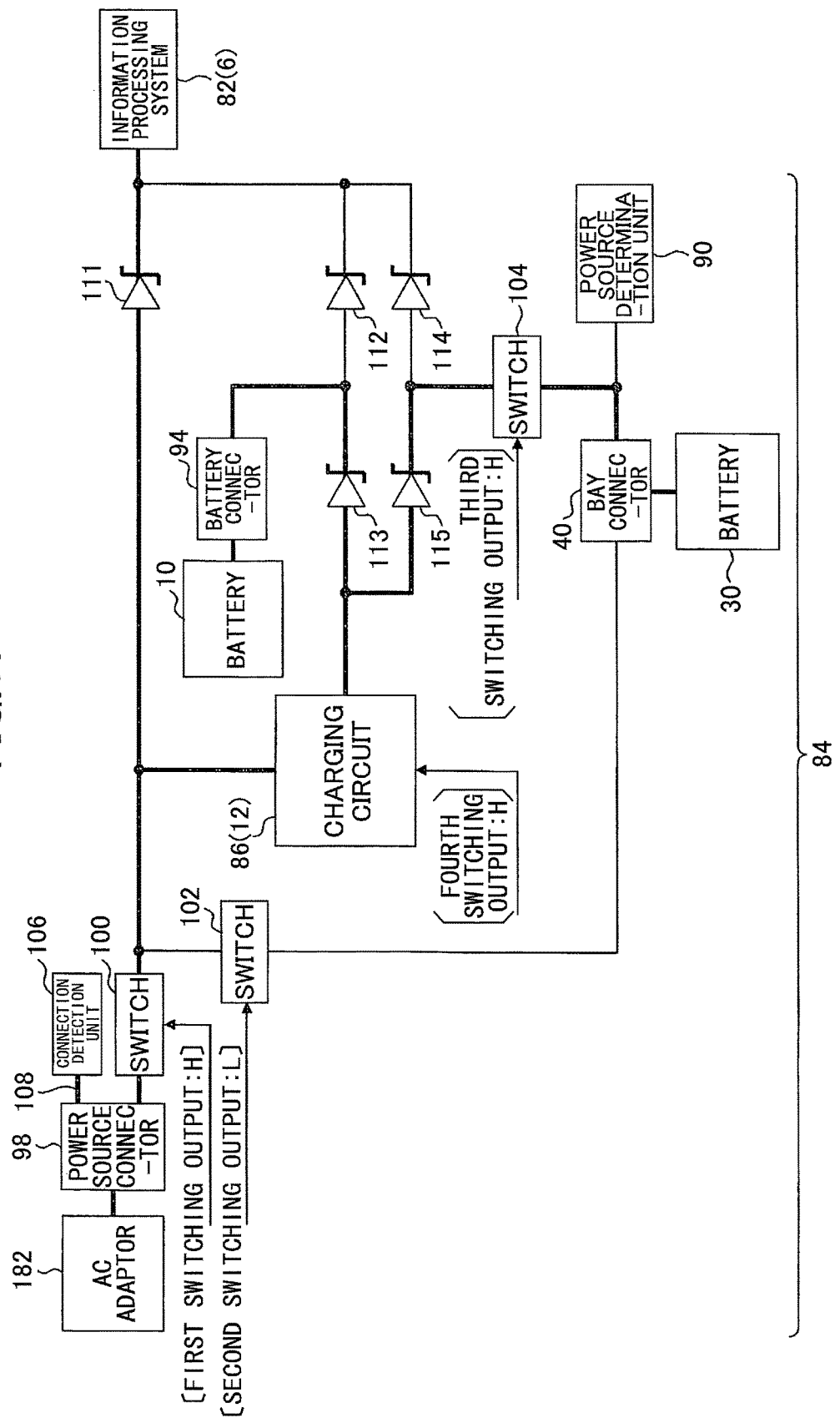
FIG. 17 illustrates an example of a second connection form of the power source system.

In the second connection form 174 illustrated in FIG. 17, the AC adaptor 182 is connected to the power source connector 98, and the battery 30 is connected to the bay connector 40.

The switch 100 conducts the power of the AC adaptor 182 connected to the power source connector 98, and supplies the power to the charging circuit 86 and the diode 111. The diode 111 conducts the power from the switch 100, and supplies the power to the information processing system 82. Meanwhile, the switch 102 cuts off the power from the switch 100, and prevents this power from flowing back to the bay connector 40.

The power supplied to the charging circuit 86 is supplied to the battery 10 and the battery 30 via the charging circuit 86. In this case, the diode 113 receives power from the charging circuit 86, conducts this power, and supplies this power to the battery 10. Furthermore, the diode 115 and the switch 104 receive power from the charging circuit 86, conduct this power, and supply this power to the battery 30.

The power supplied to the charging circuit 86 is supplied to the diodes 112, 114. However, the voltage V1 [V] of the diodes 112, 114 on the charging circuit 86 side is dropped by a voltage ΔV1 [V] by the resistance Rc of the charging circuit 86 and the resistance Rd of the diodes 113, 115. Meanwhile, the voltage V2 [V] of the diodes 112, 114 on the information processing system 82 side is dropped by a voltage ΔV2 [V] by the resistance Rd of the diode 111. When the voltage of the power from the switch 100 is, for example, 19 [V], the voltage V1 [V] becomes 19-ΔV1 [V] and the voltage V2 [V] becomes 19-ΔV2 [V]. The voltage ΔV1 [V] is greater than the voltage ΔV2 [V], and therefore the voltage V1 [V] becomes lower than the voltage V2 [V]. Therefore, the diodes 112, 114 are not able to make the power flow in the forward direction.

In the third connection form 176, the AC adaptor 182 is connected to the power source connector 98, and the power source unit 16 is connected to the bay connector 40. The AC adaptor 44 of the power source unit 16 illustrated in FIG. 18 is stored inside the adaptor case 32; however, the AC adaptor 44 may be exposed from the adaptor case 32, and may be exposed from the power source insertion bay 28 and the fixed side case 4-1.

Figure 18:
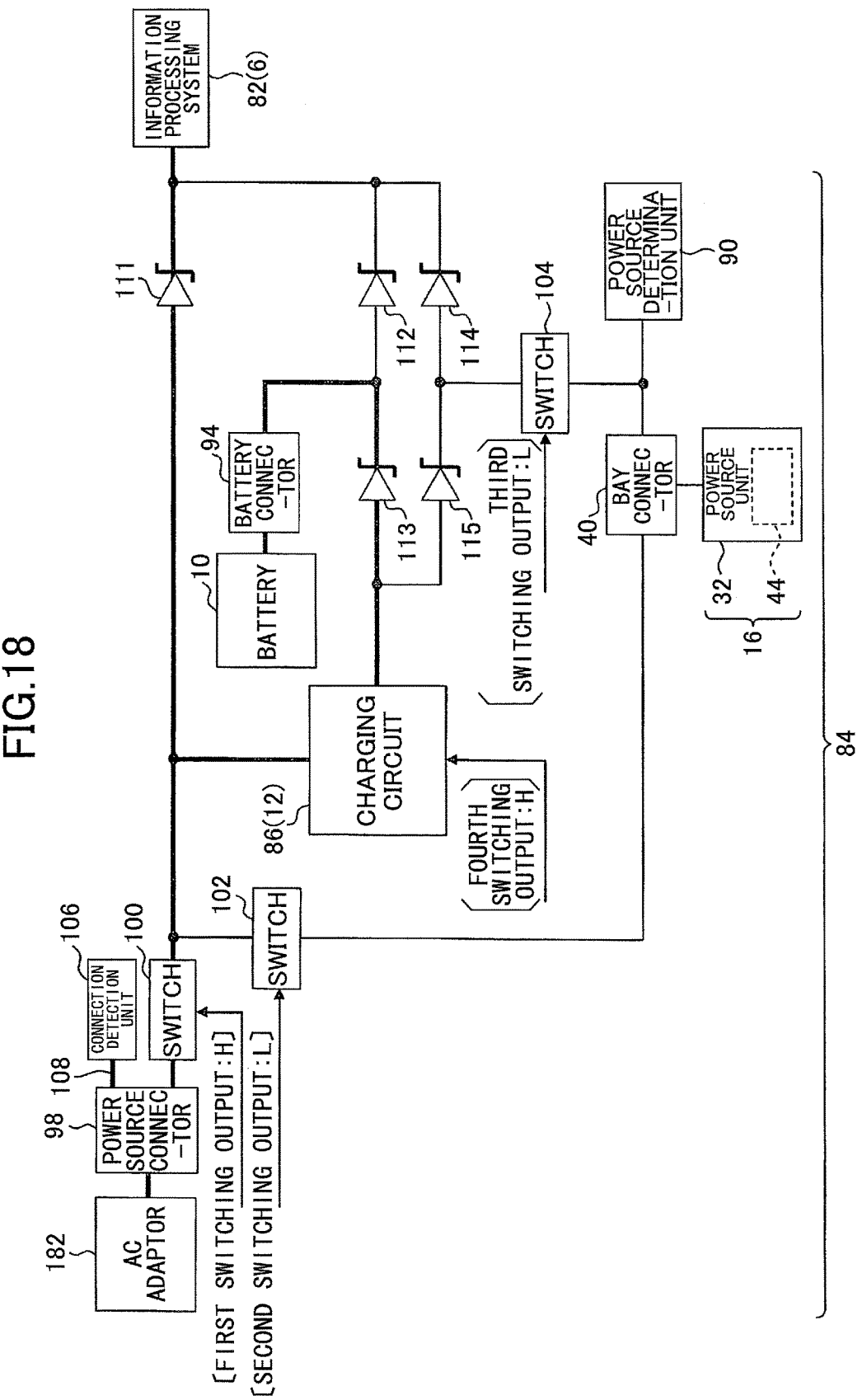
FIG. 18 illustrates an example of a third connection form of the power source system.

In the third connection form 176 illustrated in FIG. 18, the power source unit 16 is connected to the bay connector 40, and the switch 104 is OFF. Therefore, the switch 104 cuts off the power from the charging circuit 86, and prevents this power (current) from flowing to the power source unit 16. The other connection forms of the third connection form 176 are the same as the second connection form 174, and therefore descriptions thereof are omitted.

Figure 19:
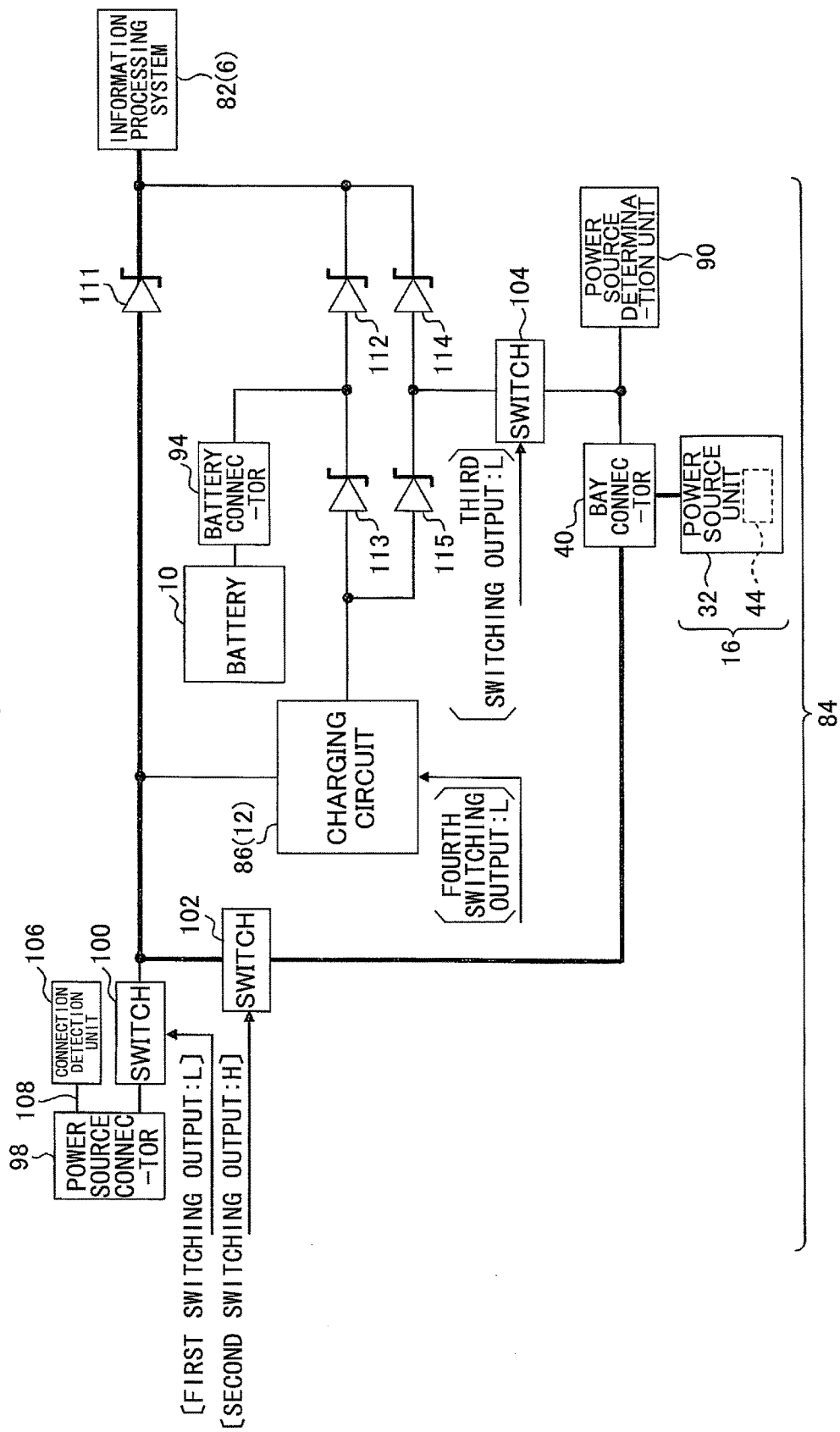
FIG. 19 illustrates an example of a fourth connection form of the power source system.

In the fourth connection form 178 illustrated in FIG. 19, the AC adaptor 182 is disconnected from the power source connector 98, and the power source unit 16 is connected to the bay connector 40. Furthermore, the AC adaptor 44 of the power source unit 16 is stored inside the adaptor case 32.

The switch 102 conducts the power of the power source unit 16 connected to the bay connector 40, and supplies the power to the switch 100, the diode 111, and the charging circuit 86. The diode 111 conducts the power from the switch 102, and supplies the power to the information processing system 82. Meanwhile, the switch 100 cuts off the power from the switch 102, and prevents this power from flowing back to the power source connector 98. Furthermore, the switch 104 cuts off the power from the power source unit 16, and prevents the power of the power source unit 16 from flowing to the information processing system 82 via the switch 104.

The diode 112 prevents the power supplied by the diode 111 from flowing back to the battery 10 and the charging circuit 86. The diode 114 prevents the power supplied by the diode 111 from flowing back to the power source unit 16 and the charging circuit 86.

The charging circuit 86 is turned OFF, and therefore cuts off the power supplied to the charging circuit 86 and suppresses the power supply to the battery 10. As a result, the power consumption is suppressed.

Figure 20:
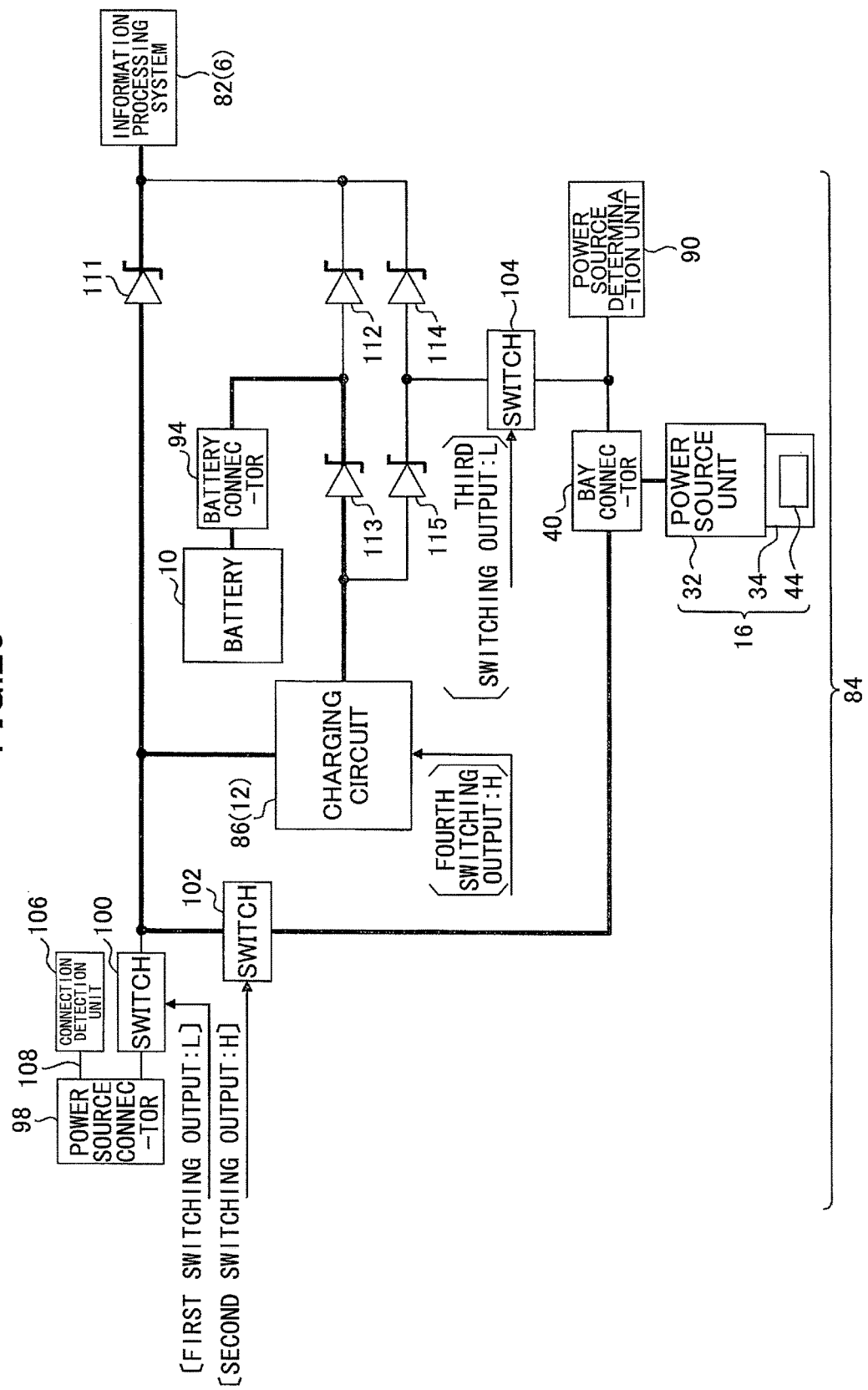
FIG. 20 illustrates an example of a fifth connection form of the power source system.

In the fifth connection form 180 illustrated in FIG. 20, the AC adaptor 182 is disconnected from the power source connector 98, and the power source unit 16 is connected to the bay connector 40. Furthermore, the AC adaptor 44 is exposed from the adaptor case 32, and is exposed from the power source insertion bay 28 and the fixed side case 4-1. Thus, unlike the fourth connection form 178 (FIG. 19), the charging circuit 86 is turned ON. As a result, the charging circuit 86 supplies the power of the power source unit 16 to the battery 10. The power source unit 16 supplies power to the information processing system 82, and supplies power to the battery 10. The heat generated by the AC adaptor 44 is discharged outside the fixed side case 4-1 from the exposed AC adaptor 44, and therefore the stability of the operations of the PC 2-2 is maintained, and heat generation of the PC 2-2 is suppressed.

The power supplied to the charging circuit 86 is supplied to the diodes 112, 114. However, due to the internal resistance of the charging circuit 86 and the diodes 113, 115, the voltage V1 [V] of the diodes 112, 114 on the charging circuit 86 side becomes lower than the voltage V2 [V] of the diodes 112, 114 on the information processing system 82 side. Therefore, the diodes 112, 114 are unable to make the power flow in a forward direction. The other connection forms of the fifth connection form 180 are the same as the fourth connection form 178 (FIG. 19), and therefore descriptions thereof are omitted.

The power source unit 16 slides the AC adaptor 44, as the heat generation unit 17 of the power source unit 16, so as to be exposed from the power source insertion bay 28 and the case 4 of the PC 2-2. Even when this heat generation unit 17 is exposed from the power source insertion bay 28 and the case 4 of the PC 2-2, the power source unit 16 may be used as the power source. When the adaptor slide part 34 provided with the AC adaptor 44 is stored inside the power source insertion bay 28, the power source unit 16 shifts to a power saving setting. By shifting to the power saving setting, the heat generation of the AC adaptor 44 is suppressed inside the power source insertion bay 28 of the PC 2-2. The power source unit 16 may be inserted in the power source insertion bay 28 and carried, and there is no need to carry a power source separately from the PC 2-2. Thus, the portability of the PC 2-2 itself is improved, and the usefulness of the power source unit 16 is improved.

Third Embodiment

In the second embodiment, when the adaptor slide part 34 including the AC adaptor 44 is stored inside, the system of the PC 2-2 is switched to a power saving setting. In order to suppress the heat generation of the power source unit 16, in addition to the power saving setting, the power source unit 16 may be limit the power supply. When limiting the power supply, a current control unit 202 (FIG. 24) is arranged in, for example, the AC adaptor 44. The current control unit 202 includes, for example, a current limiting function, and controls the limit value of the current supply, such as a supply limit of the current supply. Then, the power source unit 16 itself recognizes whether the adaptor slide part 34 is in an exposed state, and according to this recognition, the current control unit 202 controls the limit value of the current supply. When the power load applied to the AC adaptor 44 exceeds the assumed power load in a power saving setting, the current control unit 202 stops the operation of the AC adaptor 44, prevents excessive heat generation, and prevents trouble such as smoke emission and fire ignition from occurring.

Figure 21:
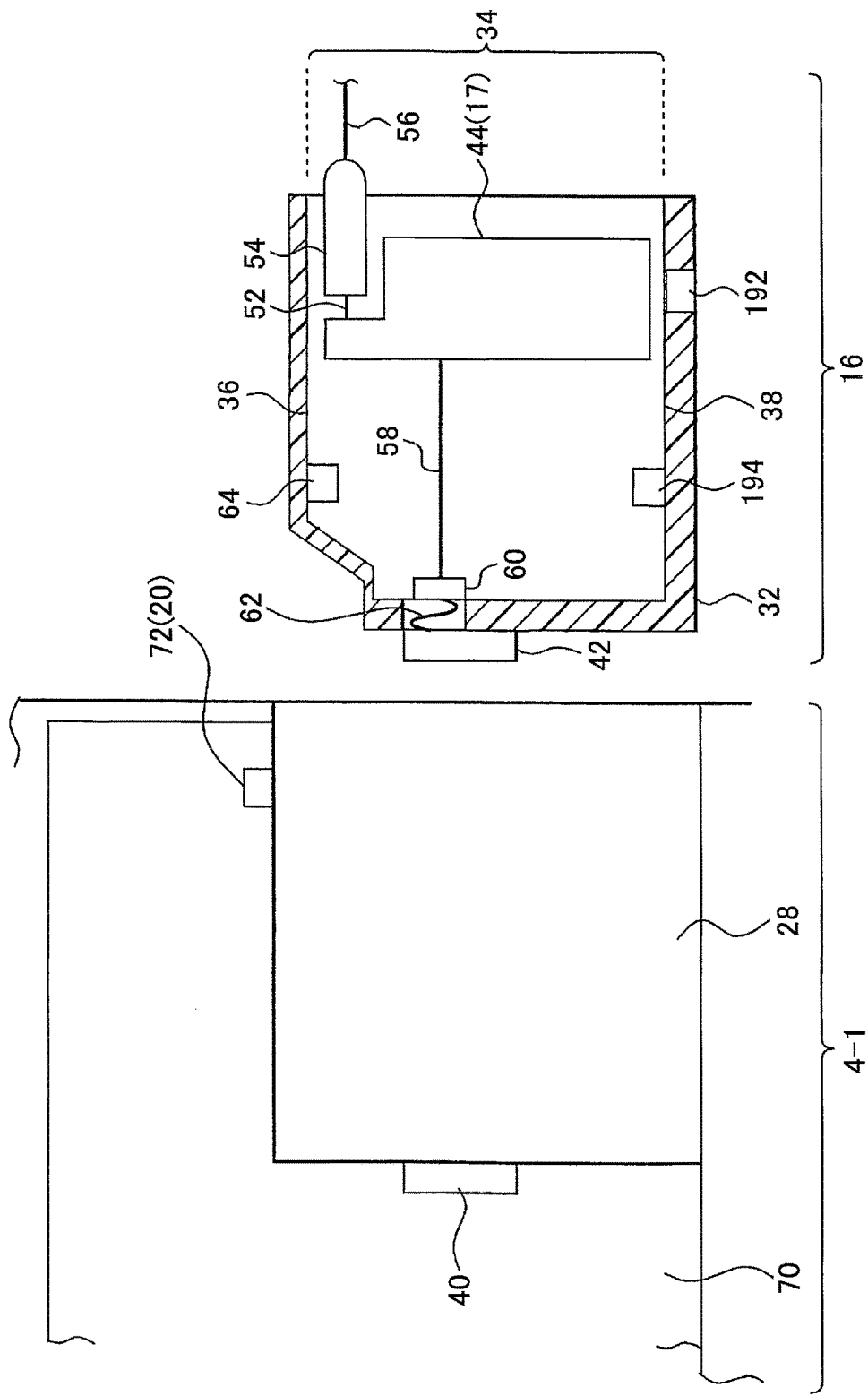
FIG. 21 illustrates an example of a power source unit and a power source insertion bay according to a third embodiment.

FIG. 21 illustrates examples of the power source unit 16 and the power source insertion bay 28. The same elements as those of FIG. 6 are denoted by the same reference numerals.

In the power source unit 16, a sensor 192 is arranged in the adaptor case 32, and a magnet 194 is arranged in the adaptor slide part 34. The sensor 192 detects the magnet 194, and detects whether the AC adaptor 44 is in a stored state or an exposed state. The sensor 192 is an example of a detection unit on the power source unit side, and for example, the sensor 192 is constituted by the above-described MR sensor. The sensor 192 outputs a detection signal of the power source unit side sensor, according to the detection of the magnet 194. The detection signal of the power source unit side sensor is used for changing the current limit value in the power source unit 16.

Figure 22:
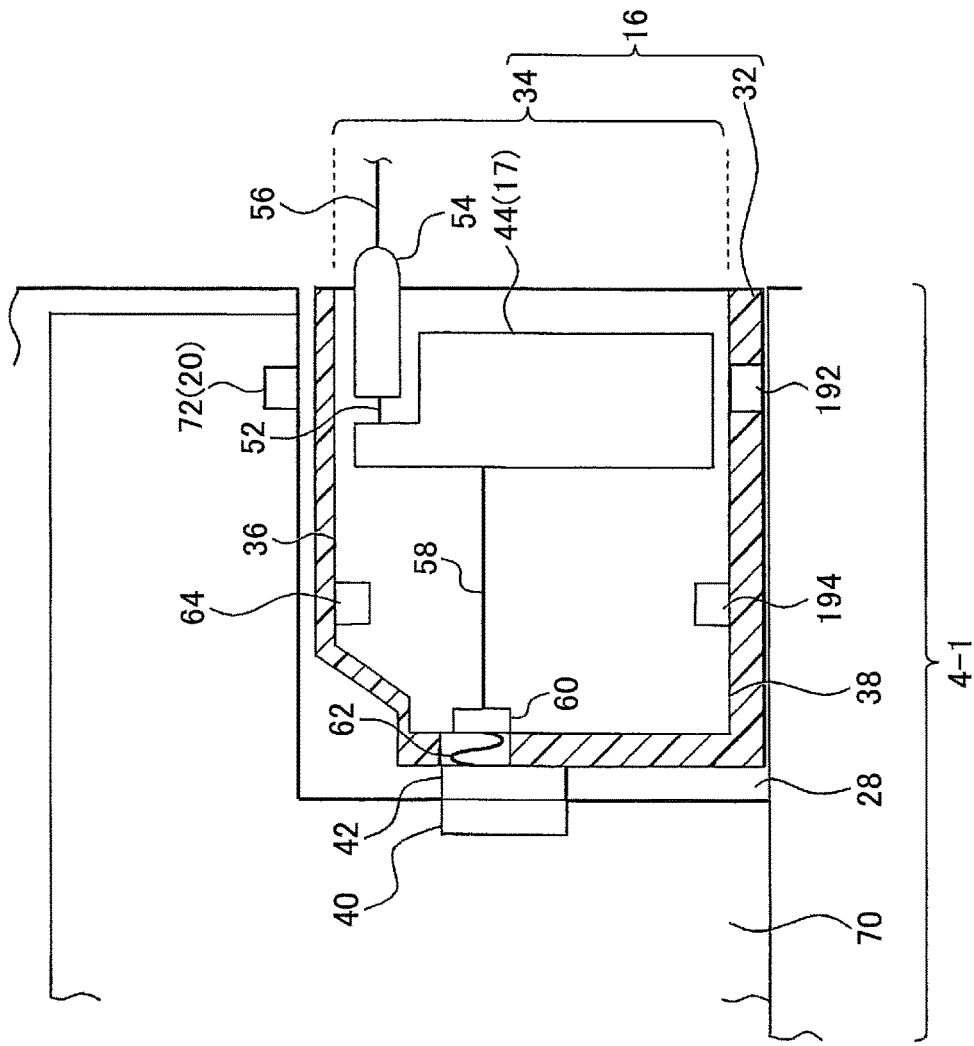
FIG. 22 illustrates an example where the power source unit is stored in the power source insertion bay.

FIG. 22 illustrates a state where the bay connector 40 and the connection connector 42 are connected, and the adaptor slide part 34 is stored in the fixed side case 4-1 and the power source insertion bay 28. The AC adaptor 44, the adaptor case 32, and the adaptor slide part 34 are stored in the fixed side case 4-1 and the power source insertion bay 28.

In a state where the adaptor slide part 34 is stored in the power source insertion bay 28 and the fixed side case 4-1, the magnet 194 and the sensor 192 are spaced apart, and the sensor 192 does not detect the magnet 194. In this case, the detection signal output by the sensor 192 is, for example, L level. This detection signal of a L level is set at, for example, 0 [V], and expresses that the state of the adaptor slide part 34 is a stored state. By the detection signal of the sensor 192, the power source unit 16 recognizes that the adaptor slide part 34 is stored inside the fixed side case 4-1 and the power source insertion bay 28.

Figure 23:
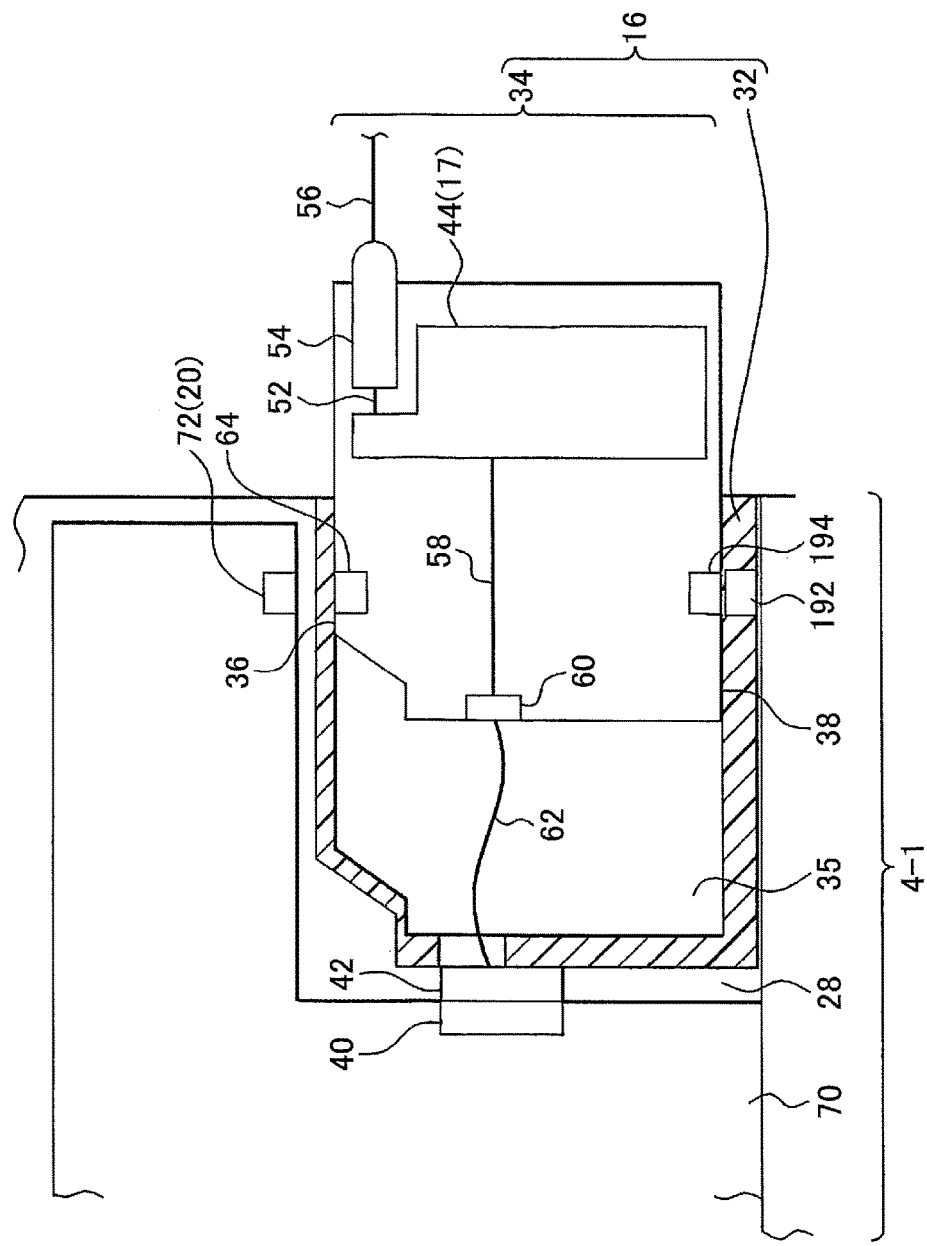
FIG. 23 illustrates an example where the power source unit is stored in the power source insertion bay and the heat generation unit of the power source unit is exposed.

FIG. 23 illustrates a state where the bay connector 40 and the connection connector 42 are connected, and the adaptor slide part 34 is exposed from the fixed side case 4-1 and the power source insertion bay 28. The AC adaptor 44 of the adaptor slide part 34 is pulled out from the adaptor case 32, the fixed side case 4-1, and the power source insertion bay 28.

When the adaptor slide part 34 is exposed from the fixed side case 4-1 and the power source insertion bay 28, the magnet 194 and the sensor 192 come close to each other and face each other, and the sensor 192 detects the magnet 194. In this case, the detection signal output by the sensor 192 is, for example, H level. This detection signal of a L level is set at, for example, 5 [V], and expresses that the state of the adaptor slide part 34 is an exposed state. By the detection signal of the sensor 192, the power source unit 16 recognizes that the adaptor slide part 34 is pulled out and exposed from the fixed side case 4-1 and the power source insertion bay 28.

Other configurations are the same as those of the second embodiment, and therefore descriptions thereof are omitted.

Figure 24:
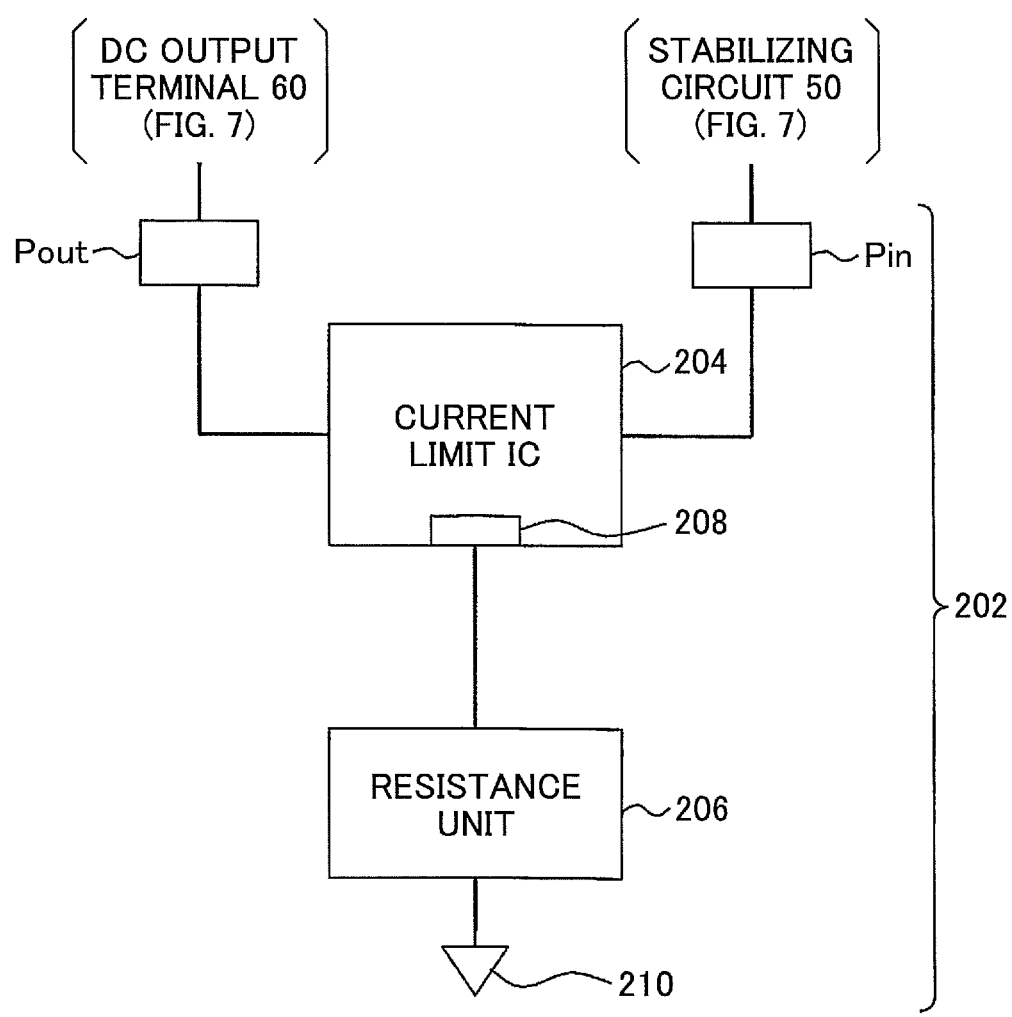
FIG. 24 illustrates an example of a current control unit.

FIG. 24 illustrates an example of a current control unit. The configuration illustrated in FIG. 24 is one example and embodiments of the present invention are not limited thereto. The current control unit 202 includes a current limit IC (Integrated Circuit) 204 and a resistance unit 206, and constitutes, for example, a control circuit for controlling the current supply. For example, the current control unit 202 is arranged between the stabilizing circuit 50 (FIG. 7) and the DC output terminal 60 (FIG. 6).

The current limit IC 204 includes a current limit adjustment pin 208, and controls the limit of the current according to the resistance value of the resistance unit 206 which is arranged between the current limit adjustment pin 208 and ground 210. When the resistance value of the resistance unit 206 is changed according to various conditions, such as the stored state or the exposed state of the AC adaptor 44, the current limit IC 204 executes current limiting according to the changing resistance value. The current limit IC 204 sets a limit to the current of the current limit IC 204 flowing from an input power source terminal Pin to an output power source terminal Pout. As the resistance value of the resistance unit 206 increases, the current limit IC 204 increases the limit of the current value. On the other hand, as the resistance value of the resistance unit 206 decreases, the current limit IC 204 decreases the limit of the current value.

Figure 25:
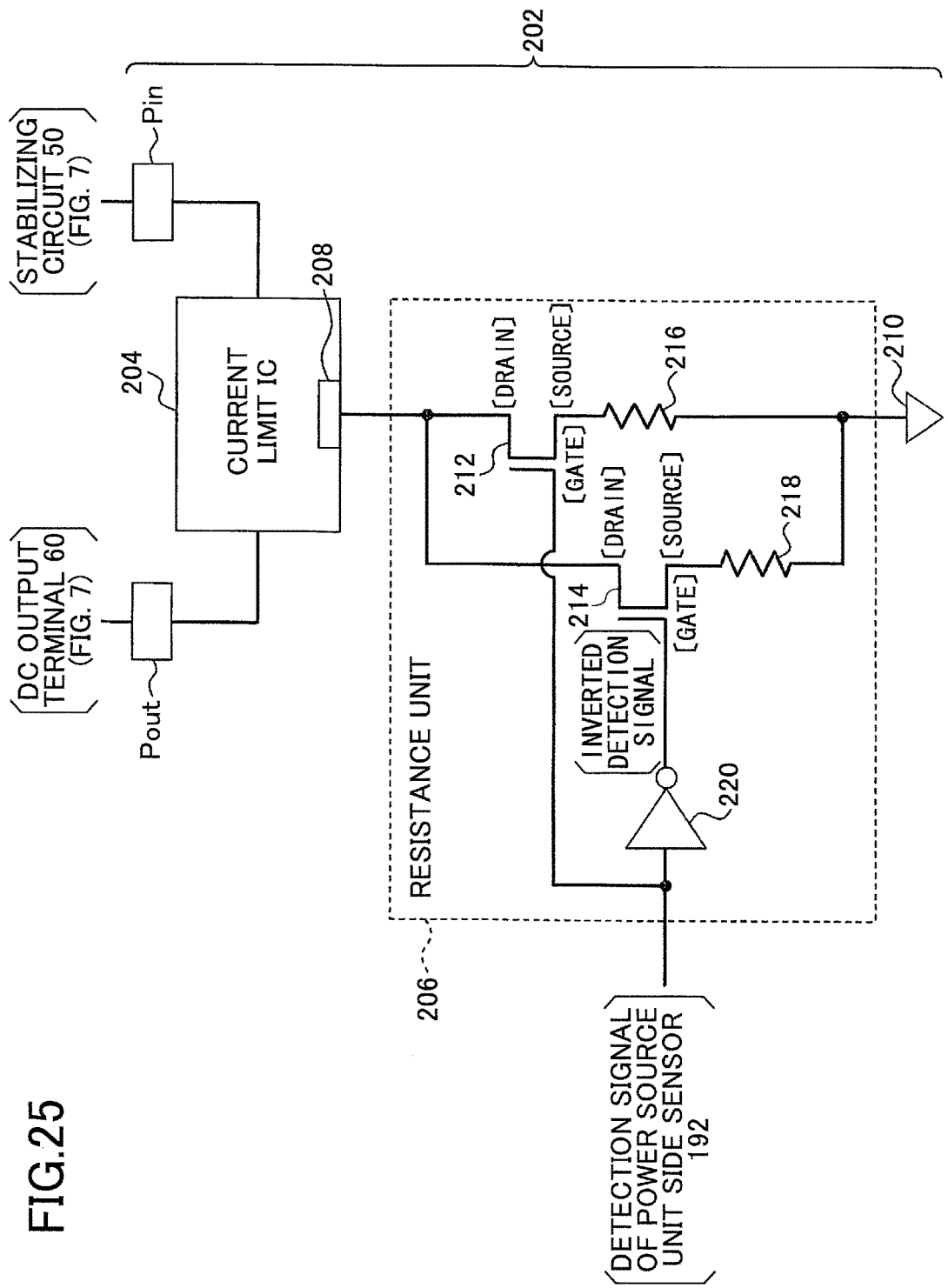
FIG. 25 illustrates an example of a current control unit and a resistance unit.

FIG. 25 illustrates examples of the current control unit and the resistance unit. The configuration illustrated in FIG. 25 is one example and embodiments of the present invention are not limited thereto.

The resistance unit 206 includes FETs (field effect transistors) 212, 214, resistance elements 216, 218, and a NOT circuit 220. Furthermore, the resistance unit 206 changes the resistance value upon receiving a detection signal from the power source side sensor 192 described above.

The FET 212 is an example of a switch, which performs conduction between the drain and the source of the FET 212 or performs cutoff between the drain and the source of the FET 212, according to the level of a signal input to the gate. The drain of the FET 212 is connected to the current limit adjustment pin 208, and the source of the FET 212 is connected to the resistance element 216.

The FET 214 is an example of a switch, which performs conduction between the drain and the source of the FET 214 or performs cutoff between the drain and the source of the FET 214, according to the level of a signal input to the gate. The drain of the FET 214 is connected to the current limit adjustment pin 208, and the source of the FET 212 is connected to the resistance element 218.

The resistance elements 216, 218 respectively have different constant resistance values. One terminal of the resistance element 216 is connected to the source of the FET 212, and the other terminal is connected to the ground 210. One terminal of the resistance element 218 is connected to the source of the FET 214, and the other terminal is connected to the ground 210.

Detection signals of the sensor 192 are input to the gate of the FET 212 and the NOT circuit 220. The NOT circuit 220 inverts the detection signal of the power source side sensor 192 from a H level to a L level, or inverts the detection signal of the power source side sensor 192 from a L level to a H level, and inputs the inverted detection signal to the gate of the FET 214. According to the inverting by the NOT circuit 220, detection signals of different levels are input to the FETs 212, 214. Thus, either one of the resistance elements 216, 218 is connected to the current limit adjustment pin 208. According to the detection signal of the sensor 192, the resistance element connected to the current limit adjustment pin 208 is switched, and it is possible to control the current limit according to the exposure and the storage of the heat generation unit 17 of the AC adaptor 44. For example, when the detection signal of the power source unit side sensor 192 is H level, the detection signal inverted at the NOT circuit 220 becomes L level. In this case, for example, the drain and the source of the FET 214 are disconnected. Meanwhile, the drain and the source of the FET 212 are connected, and therefore the current limit adjustment pin 208 is connected to the resistance element 216. When the detection signal of the sensor 192 is L level, the current limit adjustment pin 208 is connected to the resistance element 218. The resistance elements 216, 218 have different constant resistance values, and therefore the resistance value of the resistance unit 206 is variable, and the above-described current limiting function may be executed.

Fourth Embodiment

In the second and third embodiments, according to the stored state or the exposed state of the AC adaptor 44, the charging circuit 86 is switched between ON or OFF. When the notebook computer is reduced in size, the volume of the notebook computer is reduced, and it becomes difficult to design the heat discharging configuration in the case where the AC adaptor is stored. In the fourth embodiment, for example, when the PC 2-2 is operating, and shifts to the fourth connection form 178 (FIG. 19) described above, the in heat generation of the AC adaptor 44 is further suppressed. In order to further suppress the heat generation, the information processing system 82 decelerates the operation clock of a CPU 226 (FIG. 26) of the PC 2-2, or reduces the light of the display unit 18 such as a display. According to the deceleration or the reduction of light, the amount of power requested by the information processing system 82 to the AC adaptor 44 is reduced.

Figure 26:
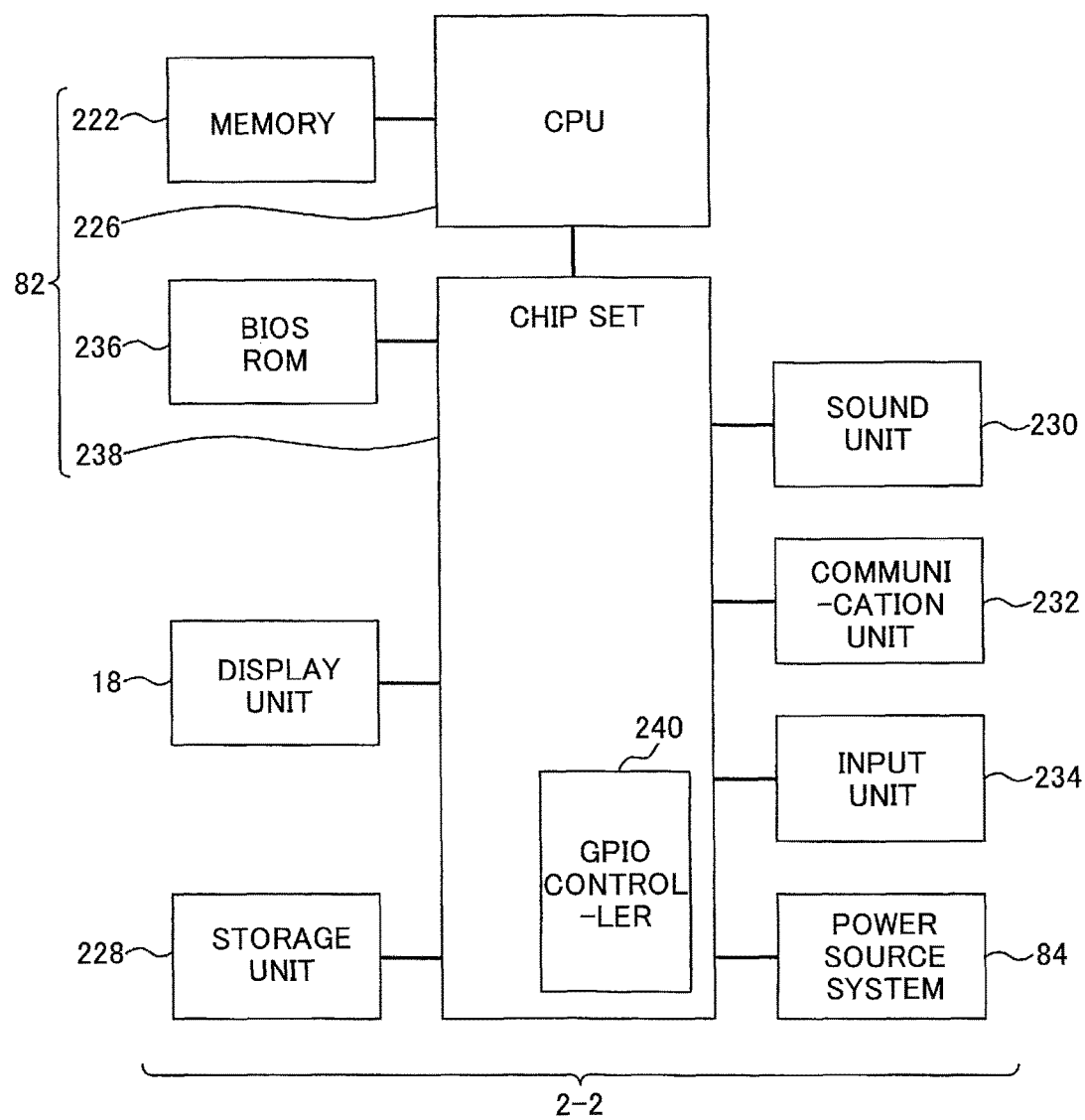
FIG. 26 illustrates an example of hardware of a notebook computer.

FIG. 26 illustrates an example of hardware of the PC 2-2. The configuration illustrated in FIG. 26 is one example and embodiments of the present invention are not limited thereto. The same elements as those of FIGS. 1, 3, and 10 are denoted by the same reference numerals.

A memory 222 is an example of a storage medium to which high-speed access is possible, which is constituted by, for example, a RAM (Random Access Memory). For example, the memory 222 is used for storing or reading temporary data at high speed.

The CPU 226 is an example of an information processing unit for executing an OS (Operating System) and various programs stored in a storage unit 228. The image processing speed of the CPU 226 changes according to the clock frequency generated by the PC 2-2. When the clock frequency is high, the image processing speed of the CPU 226 increases.

The display unit 18 is the same as that of the embodiments described above, and therefore a description thereof is omitted.

The storage unit 228 is an example of a unit for storing data, and includes, for example, a hard disk or a ROM (Read Only Memory). The storage unit 228 stores the OS, various programs executed by the CPU 226, and various kinds of data. Note that the storage unit 228 may include a hard disk and a in ROM, or may include a RAM in addition to the hard disk or the ROM.

A sound unit 230 is an example of a sound output unit for outputting sound, and is constituted by, for example, a speaker. The sound output by the sound unit 230 includes a warning by sound. Note that the sound unit 230 may include a sound receiving unit for receiving sound. For example, the sound receiving unit may be constituted by a microphone.

The communication unit 232 is used for communicating with external units. The communication unit 232 includes, for example, a network card or an input/output port, and is used for connection of LAN (Local Area Network) in a wired manner, for example. Furthermore, the communication unit 232 includes an antenna and a communication module, and is used for wireless communication by a cellular network or Wi-Fi.

An input unit 234 is an example of a data generating unit for generating data according to operations, and is constituted by, for example, the keyboard 26 and mouse or a touch panel.

The display unit 18, the storage unit 228, the sound unit 230, the communication unit 232, and the input unit 234 are examples of peripheral devices of the PC 2-2.

A BIOS (Basic Input/Output System) ROM 236 is an example of a unit for storing BIOS, and is constituted by, for example, a ROM. BIOS is an example of a program for controlling the above-described peripheral devices.

A chip set 238 is an example of a unit for managing the receiving or sending of data performed with the CPU 226. For example, the chip set 238 is constituted by LSI (Large Scale Integration). The chip set 238 includes a GPIO (General Purpose in Input/Output) controller 240. GPIO is an input output terminal that may be used for various purposes. The GPIO controller 240 controls GPIO.

The memory 222, the CPU 226, the BIOS ROM 236, and the chip set 238 are examples of the information processing system 82 described above. The information processing system 82 is connected to the power source system 84. The power source system 84 supplies power to the information processing system 82 and the above-described peripheral devices, and supplies, to the information processing system 82, switching output used for releasing the deceleration or the acceleration the operation clock of the CPU 226.

The deceleration of the operation clock of the CPU 226 is performed, for example, when the AC adaptor 182 is disconnected from the power source connector 98, the power source unit 16 is connected to the bay connector 40, and the AC adaptor 44 is stored in the fixed side case 4-1. That is to say, when the first detection signal is L level, the second detection signal is H level, and the detection signal of the sensor is L level, for example, a switching output of a L level is generated. This switching output of a L level is an example of power saving control output, and expresses that the operation clock of the CPU 226 is decelerated and set to a power saving setting. In cases of detection signals other than the above, for example, a switching output of a H level is generated. The switching output of a H level is an example of regular control output, and expresses that the operation clock of the CPU 226 is set to a regular clock speed. The switching output of the L level or the H level is an example of a switching output for switching the speed of the clock of the CPU 226, which is generated by, for example, the power source switching unit 92.

Figure 27:
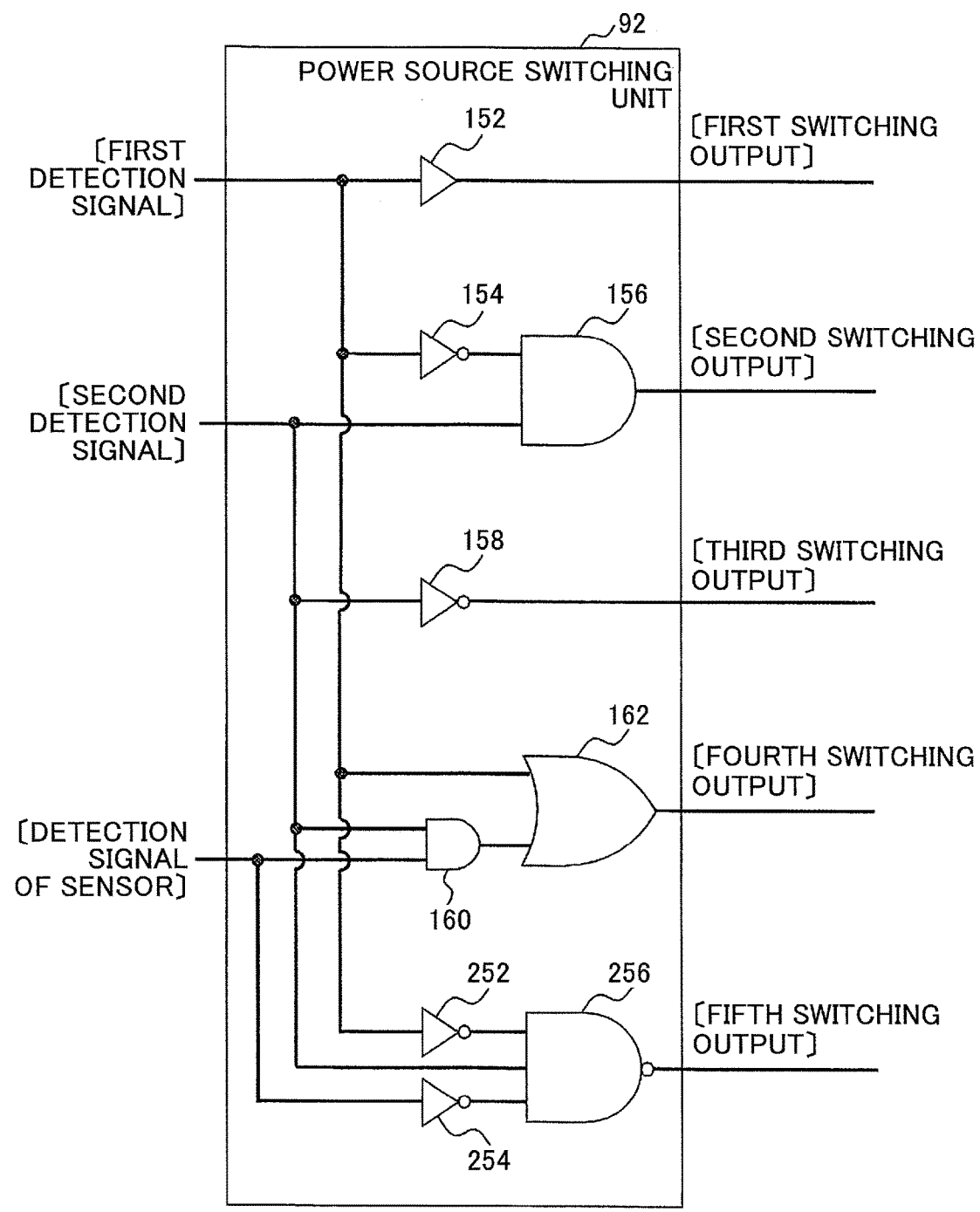
FIG. 27 illustrates an example of a power source switching unit.

FIG. 27 illustrates an example of a power source switching unit 92. The configuration illustrated in FIG. 6 is one example and embodiments of the present invention are not limited thereto. The same elements as those of FIG. 13 are denoted by the same reference numerals.

The power source switching unit 92 illustrated in FIG. 27 includes NOT circuits 252, 254 and a NAND circuit 256, in addition to the circuit configuration of the power source switching unit 92 illustrated in FIG. 13. The power source switching unit 92 generates and outputs a fifth switching output, as the switching output for switching the speed of the operation clock of the CPU 226 described above. That is to say, the power source switching unit 92 controls the operation clock of the CPU 226 by outputting a fifth switching output.

The fifth switching output is generated from the first and second detection signals and the detection signal of the sensor, with the use of the NOT circuits 252, 254 and the NAND circuit 256. The NOT circuit 252 receives the first detection signal, inverts the first detection signal, and outputs the inverted first detection signal. The NOT circuit 254 receives a detection signal of the sensor, inverts the detection signal of the sensor, and outputs the inverted detection signal of the sensor. The NAND circuit 256 receives the inverted first detection signal output by the NOT circuit 252, the second detection signal, and the inverted detection signal of the sensor output by the NOT circuit 254, and outputs a negative value of a logical product of these signals. According to these circuits, the above-described switching output of the L level and the switching output of the H level are obtained. The power source switching unit 92 may receive the three detection signals, generate five switching outputs, and switch at least five function units. The first through fourth switching outputs are the same as those of the second embodiment, and descriptions thereof are omitted.

The fifth switching output that is output by the power source switching unit 92 is reported to the BIOS stored in the BIOS ROM 236 via the GPIO controller 240. The BIOS receives the fifth switching output, and controls the operation clock of the CPU 226. For example, the BIOS switches the setting value of the clock set in the register of the CPU 226, and changes the operation clock of the CPU 226.

The fifth switching output may be used for changing the luminance, for example, the brightness of the display unit 18, other than for changing the operation clock of the CPU 226. In this case, for example, the luminance of the display unit 18 is controlled by a setting value of the register of the chip set 238. Thus, for example, the BIOS receives the fifth switching output, changes the setting value of the register of the chip set 238, and changes the luminance of the display unit 18.

Other configurations are the same as those of the second embodiment or the third embodiment, and a description thereof is omitted.

Fifth Embodiment

In a fifth embodiment, when the AC adaptor 44 is stored inside the power source insertion bay 28 and the fixed side case 4-1, and the power consumption exceeds a reference value, the PC 2-2 generates a warning. For example, when an application of high power consumption is activated, the PC 2-2 generates a warning. To output the warning, for example, the display unit 18 (FIG. 26) or the sound unit 230 (FIG. 26) is used. The display unit 18 and the sound unit 230 are examples of a notification unit to send a notification of the warning. Other configurations are the same as those of the above-described embodiments, and a description thereof is omitted.

Figure 28:
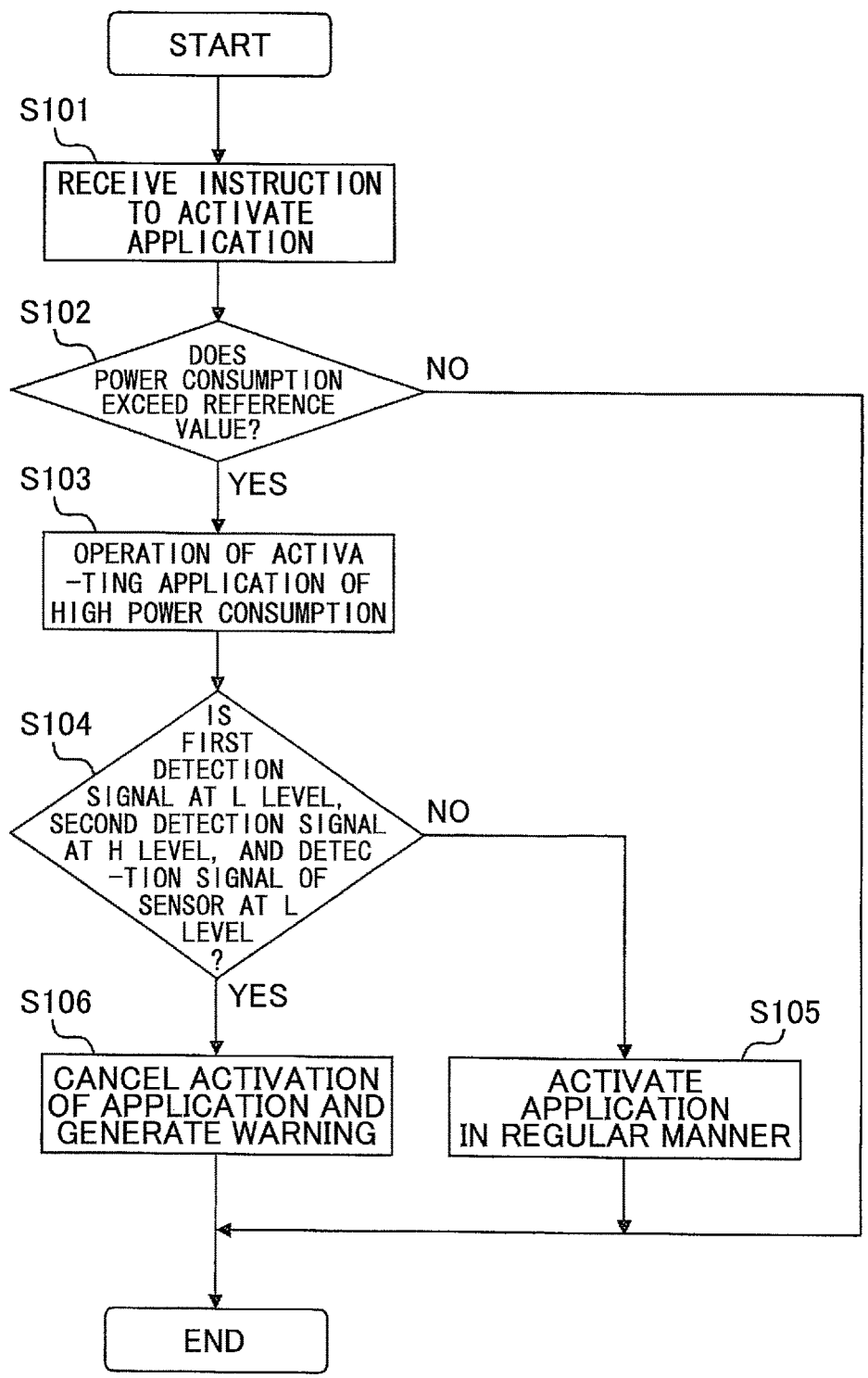
FIG. 28 is a flowchart of an example of processing procedures for generating a warning.

FIG. 28 illustrates an example of processing procedures for generating a warning. The processing procedures for generating a warning are executed by, for example, the CPU 226.

When the CPU 226 receives an instruction to activate an application (step S101), the CPU 226 determines whether the power consumption of the application to be activated exceeds a reference value. This reference value is, for example, a power consumption value that is usable by a single application, when the AC adaptor 44 is in a stored state. This reference value is set in advance in, for example, the storage unit 228 or the memory 222 (FIG. 26) of the PC 2-2. When the power consumption exceeds the reference value (YES in step S102), the CPU 226 performs the operation of activating the application of high power consumption (step S103), and confirms the status of the detection signal. The confirmation of the status is, for example, the confirmation of whether the first detection signal is L level, the second detection signal is H level, and the third detection signal is L level. When the detection signals are in this status (YES in step S104), the CPU 226 cancels the activation of the application, generates a warning (step S106), and ends the process. In other cases (NO in step S104), the CPU 226 activates the application in a regular manner (step S105), and ends the process. The confirmation of the status of the detection signal may be performed by using, for example, the above-described fifth switching output. The CPU 226 is to determine that when the fifth switching output is L level, the first detection signal is L level, the second detection signal is H level, and the third detection signal is L level. Furthermore, the CPU 226 is to determine that the signals are of statuses other than the above, when the fifth switching output is H level.

The warning made by the CPU 226 is, for example, a warning displayed on the display unit 18, or a warning given by a warning sound output from the sound unit 230. Furthermore, the warning made by the CPU 226 may be both a displayed warning and a warning made by a warning sound.

Figure 29:
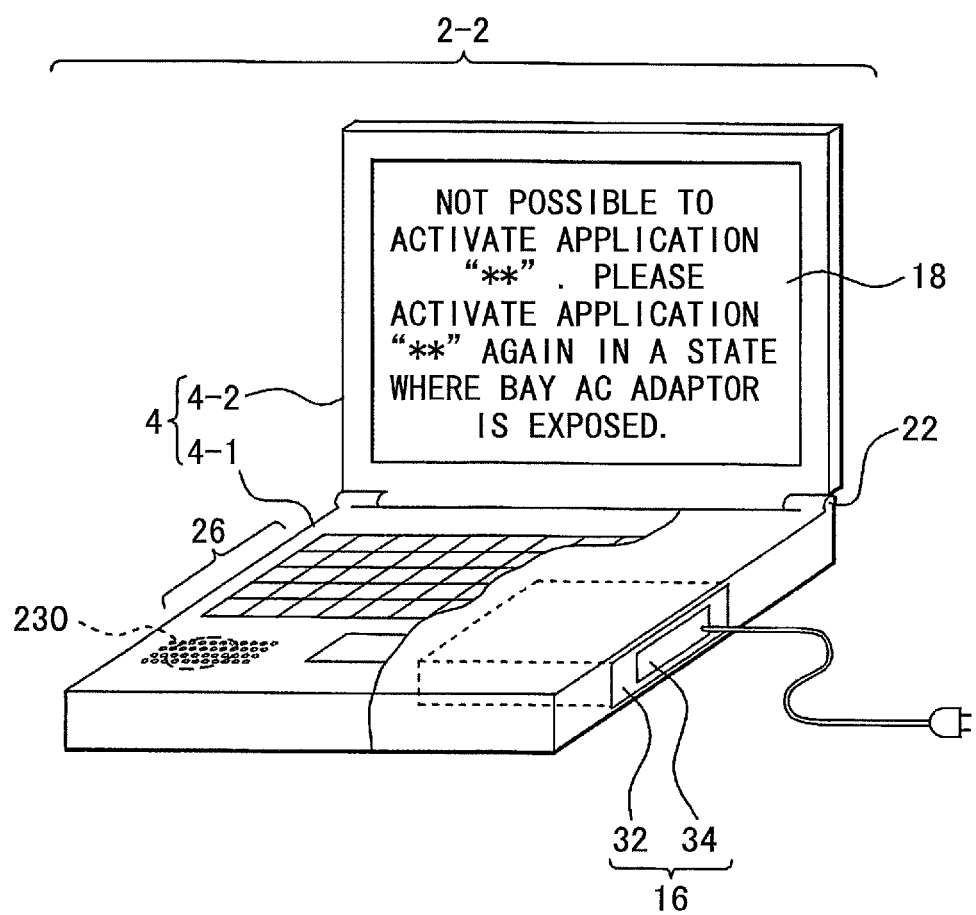
FIG. 29 illustrates an example of a displayed warning.

FIG. 29 is an example of a displayed warning. The displayed warning illustrated in FIG. 29 is one example, and may be other displayed warnings; the displayed warning of the present invention is not limited thereto. In FIG. 29, "" expresses the application name, and the "bay AC adaptor" expresses an AC adaptor connected to the power source insertion bay 28, such as the AC adaptor 44.

In the warning of FIG. 29, a message saying "Not possible to activate application "". Please activate application "" again in a state where bay AC adaptor is exposed." is displayed on the display unit 18.

When a warning is made by sound, for example, a message saying "Not possible to activate application "". Please activate application "" again in a state where bay AC adaptor is exposed." is output from the sound unit 230. A warning made by sound may be, for example, a warning buzzer using a buzzer sound.

According to a displayed warning or a warning made by sound, it is possible to send a notification to the user to cancel the activation of the application, and to prompt the user to expose the heat generation unit 17 of the AC adaptor 44.

Other Embodiments (1) In the above embodiments, the power source cable 62 is constituted by a cable having stretching properties; however, the present invention is not so limited. By storing a power source cable 62 that does not have stretching properties, in the storage space part 35 between the adaptor case 32 and the adaptor slide part 34, the adaptor slide part 34 may slide by a predetermined slide stroke.

(2) In the above embodiments, when both the AC adaptor 182 and the power source unit 16 are connected, switching is performed to prioritize the AC adaptor 182; however, the present invention is not so limited. The switching may be performed to prioritize the power source unit 16 over the AC adaptor 182. In this configuration, when both the AC adaptor 182 and the power source unit 16 are connected, the switch 100 may be turned OFF and the switch 102 may be turned ON. Furthermore, according to whether the adaptor slide part 34 is in a stored state or an exposed state, the charging circuit 86 may be turned ON or OFF.

Figure 30:
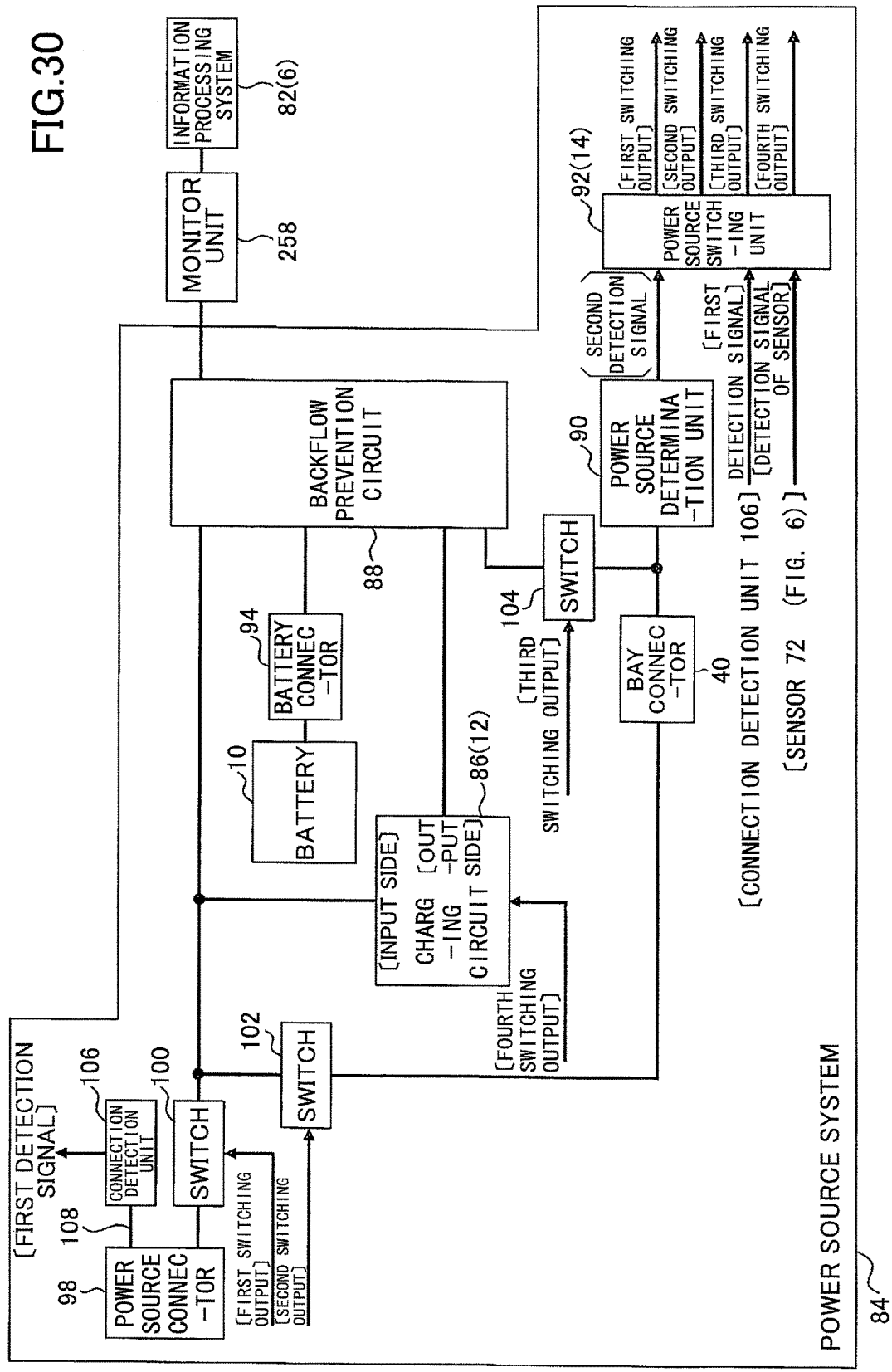
FIG. 30 illustrates an example of an information processing system and a power source system according to another embodiment.

(3) In the above embodiments, when an application having high power consumption is activated, a warning is displayed to expose the heat generation unit 17 of the power source unit 16; however, the present invention is not so limited. For example, a monitor unit 258 (FIG. 30) is provided between the information processing system 82 and the power source system 84, for monitoring the current flowing to the information processing system 82. When a current value detected by the monitor unit 258 exceeds a reference value, the information processing system 82 may generate a warning. By such a configuration, for example, when the overall power consumption becomes high, such as when a plurality of applications are activated, a warning may be generated.

(4) In the above embodiments, when the heat generation unit 17 of the power source unit 16 is in a stored state, power saving control is implemented. For example, also when the power consumption of the notebook computer is high, and the heat generation unit 17 of the power source unit 16 is in an exposed state but the current is insufficient, power saving control may be implemented.

(5) In the above embodiments, the adaptor case 32 and the adaptor slide part 34 contact each other on a flat plane; however, the present invention is not so limited. For example, the adaptor slide part 34 and the adaptor case 32 may be spaced apart by a predetermined interval, and a slide unit may be provided between the adaptor slide part 34 and the adaptor case 32. This slide unit includes, for example, a guide rail and a moving member that moves in one direction by being limited by the guide rail. By providing a guide rail in one of the adaptor case 32 and the adaptor slide part 34, and providing the moving member in the other one of the adaptor case 32 and the adaptor slide part 34, the adaptor slide part 34 is able to slide.

(6) In the above embodiments, an example is described in which the sensor 192 is provided in the adaptor case 32, and the magnet 194 is provided in the adaptor slide part 34; however, the present invention is not so limited. The arrangement of the sensor 192 and the magnet 194 may be reversed, and the magnet 194 may be provided in the adaptor case 32 and the sensor 192 may be provided in the adaptor slide part 34. Furthermore, the sensors 72, 192 may be provided with a magnet, the magnets 64, 194 may be omitted, and the sensors 72, 192 may be configured to detect the other sensor. In this case, for example, the sensor 192 is provided at the position of the magnet 64 illustrated in FIG. 6. By having the respective sensors detect the other sensor, it is possible to obtain detection signals of the sensors by both the PC 2-2 and the power source unit 16. The arrangement positions and the number of arrangements of the magnets and sensors may be modified in various embodiments.

(7) In the above embodiments, the magnet 64 is provided in the adaptor slide part 34, and the sensor 72 is provided on the substrate 70; however, the present invention is not so limited. For example, the magnet 64 may be provided in one of the adaptor case 32 and the adaptor slide part 34, and the sensor 72 may be provided in the other one of the adaptor case 32 and the adaptor slide part 34. In this case, the power source unit 16 obtains the detection signal of the sensor 72. Accordingly, the detection signal of the sensor 72 is sent to the PC 2-2 side by a communication means. As the communication means, communication may be performed via a circuit wiring of the PC 2-2 and the power source unit 16, or communication may be performed via a wireless LAN such as Wi-Fi. Even in such a configuration, the power source switching unit 92 may receive the detection signal of the sensor, and output the first through fifth switching outputs.

(8) In the above embodiments, the sensor 192 is provided in the adaptor case 32, and the magnet 194 is provided in the adaptor slide part 34. On the other hand, for example, the detection signals of the sensor 72 may be sent to the power source unit 16 by the above-described communication means, without providing a sensor 192 or a magnet 194. By this configuration, it is possible to use the detection signals of the sensor 72 in both the PC 2-2 and the power source unit 16.

(9) In the above embodiments, in order to detect whether the heat generation unit 17 of the adaptor slide part 34 is stored or exposed, for example, a magnet and a MR sensor are used; however, the present invention is not so limited. For example, as the distance sensor, an optical sensor or a proximity sensor may be used to detect the movement of the adaptor slide part 34.

(10) In the above embodiments, when sending a warning notification, the status of the detection signal is confirmed after the CPU 226 performs the operation of activating an application having high power consumption; however, the present invention is not so limited. For example, the status of the detection signal may be confirmed before performing the operation of activating the application, and the application may be activated in a regular manner when it is possible to activate the application. By such a configuration, it is possible to omit the process of performing an operation of activating an application having high power consumption and then cancelling the operation of activating the application.

(11) In the above embodiments, an example is given of the first connection form 172 through the fifth connection form 180; however, the present invention is not so limited. For example, when the power source unit 16 storing the AC adaptor 44 is connected to the bay connector 40, the switch 102 may be turned OFF and the switch 104 may be turned ON, and power may be supplied via the switch 104. When the battery 30 is connected to the bay connector 40, the switch 102 may be turned ON, the switch 104 may be turned OFF, the charging circuit may be turned OFF, and power may be supplied via the switch 102. By constituting the circuit of the power source switching unit 92 so as to execute such a connection form, power may be supplied to the information processing system 82. The connection form of the power source system 84 and the power source switching unit 92 executing this connection form may be modified and changed in various manners.

(12) In the above embodiments, a notebook computer is described as an example of the electronic device according to embodiments of the present invention; however, the present invention is not so limited. Any information processing device is applicable, as long as the AC adaptor may be stored. For example, a personal digital assistance (PDA), a tablet PC, a mobile phone, and imaging devices such as a camera and a video camera may be used.

Figure 31:
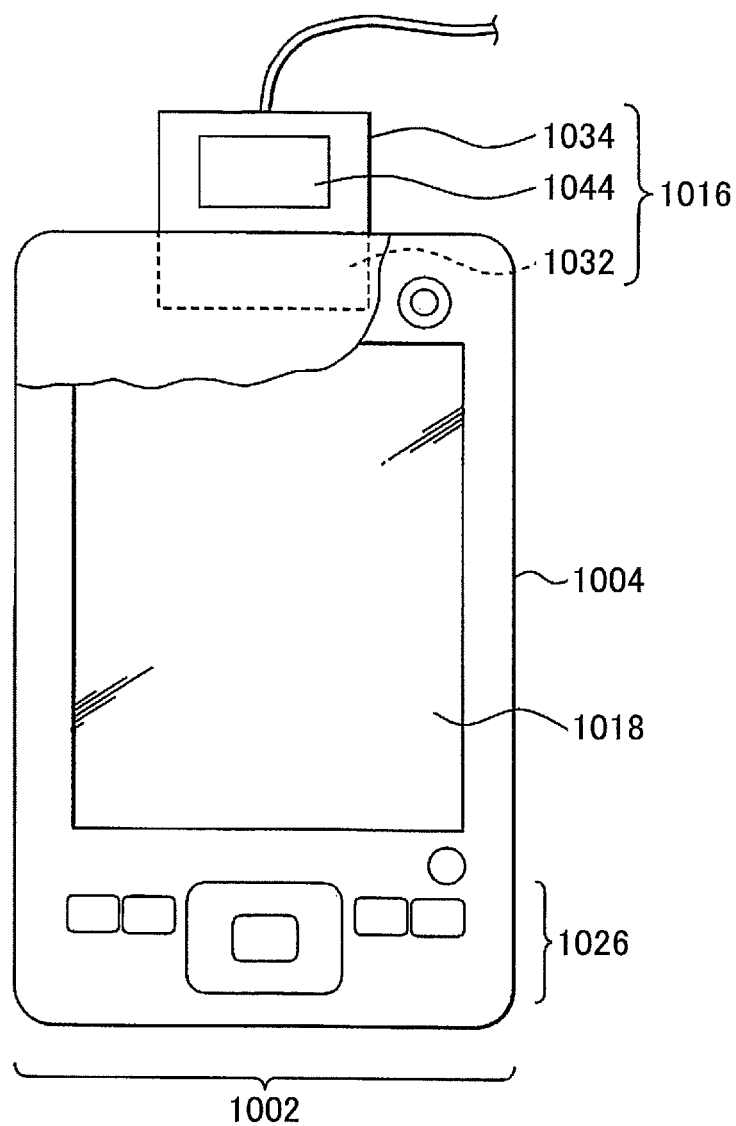
FIG. 31 illustrates an example of a PDA according to another embodiment.

FIG. 31 illustrates an example of a PDA 1002 as the electronic device. A case 1004 of the PDA 1002 is provided with a display unit 1018 and operation keys 1026. The display unit 1018 functions as the display unit 18 described above, and also includes, for example, a touch panel, to function as the input unit 234 (FIG. 26) described above. The PDA 1002 is provided with a power source insertion bay at the top side middle part as viewed from the top face side of the case 1004, and a power source unit 1016 is inserted in the power source insertion bay. The power source unit 1016 includes an adaptor case 1032, an adaptor slide part 1034, and an AC adaptor 1044. As the adaptor slide part 1034 slides with respect to the adaptor case 1032, the AC adaptor 1044 is stored in the case 1004 and the adaptor case 1032, or the AC adaptor 1044 is exposed from the case 1004 and the adaptor case 1032. The effects of the present invention may be achieved also by the PDA 1002.

According to an aspect of the embodiments, an electronic device, a power source device, and a power control method of an electronic device are provided, by which the following effects are achieved. The load with respect to the power source unit is controlled according to whether the power source unit is in a stored state or an exposed state, thereby promoting the heat discharge of the power source device, or suppressing the heat generation of the power source device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device comprising:
    a case;
    a power source unit including a heat generation unit, the power source unit being configured to be inserted in the case and slidable between a stored state in which the power source unit is stored in the case and an exposed state in which at least the heat generation unit is exposed from the case, wherein an electrical connection between the power source unit and an electrical circuit in the case is maintained between the stored state and the exposed state;
    a detection unit configured to detect the stored state or the exposed state of the power source unit; and
    a control unit configured to control a load with respect to the power source unit, according to the stored state or the exposed state detected by the detection unit.

2. The electronic device according to claim 1, wherein the load includes
    a charging circuit used for charging a battery set in the case, or
    an operation unit configured to be operated by the power source unit or the battery.

3. The electronic device according to claim 1, further comprising:
    a notification unit configured to send a notification that the power source unit is to be shifted from the stored state to the exposed state, when the load exceeds a reference value.

4. The electronic device according to claim 1, wherein the power source unit changes a current limit value according to the stored state or the exposed state.

5. The electronic device according to claim 2, wherein the control unit controls an operation of the charging circuit according to the stored state or the exposed state.

6. The electronic device according to claim 2, wherein the operation unit includes a CPU configured to process information; and
    the control unit is configured to control an operation speed of the CPU.

7. The electronic device according to claim 2, wherein the operation unit includes a display unit configured to display information; and
    the control unit is configured to control a brightness of the display unit.

8. A power source device that is detachably inserted in an electronic device, the power source device comprising:
    a case configured to be inserted in the electronic device; and
    a power source unit including a heat generation unit, the power source unit being slidable between a stored state in which the power source unit is stored in the case and an exposed state in which at least the heat generation unit is exposed from the case, wherein an electrical connection between the power source unit and an electrical circuit in the case is maintained between the stored state and the exposed state.

9. The power source device according to claim 8, further comprising:
    a detection unit configured to detect whether the power source unit is in the stored state in which the power source unit is stored in the case or the exposed state in which the power source unit is exposed from the case.

10. A power control method of an electronic device, the power control method comprising:
    setting a power source unit including a heat generation unit, the power source unit being configured to be inserted in a case, and being slidable between a stored state in which the power source unit is stored in the case and an exposed state in which at least the heat generation unit is exposed from the case, wherein an electrical connection between the power source unit and an electrical circuit in the case is maintained between the stored state and the exposed state;
    detecting the stored state or the exposed state of the power source unit; and
    controlling a load with respect to the power source unit, according to the stored state or the exposed state of the power source unit.

11. The power control method according to claim 10, wherein the controlling includes controlling the load including
    a charging circuit used for charging a battery set in the case, or
    an operation unit configured to be operated by the power source unit or the battery.

12. The power control method according to claim 10, further comprising:
    sending a notification that the power source unit is to be shifted from the stored state to the exposed state, when the load exceeds a reference value.

13. The power control method according to claim 10, further comprising:
   changing a current limit value according to the stored state or the exposed state.

14. The power control method according to claim 11, further comprising:
   the controlling of .the load includes controlling an operation of the charging circuit according to the stored state or the exposed state.

15. The power control method according to claim 11, wherein
   the controlling of the load includes controlling an operation speed of a CPU, which is configured to process information, included in the operation unit.

16. The power control method according to claim 11, wherein
   the controlling of the load includes controlling a brightness of a display unit, which is configured to display display information, included in the operation unit.

\* \* \* \* \*